US012411624B1

(12) United States Patent
Subramanian et al.

(10) Patent No.: US 12,411,624 B1
(45) Date of Patent: Sep. 9, 2025

(54) TECHNIQUES FOR NODE RESOURCE BALANCING

(71) Applicant: Dell Products L.P., Hopkinton, MA (US)

(72) Inventors: Vasudevan Subramanian, Chapel Hill, NC (US); Gajanan S. Natu, Cary, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/662,494

(22) Filed: May 13, 2024

(51) Int. Cl.
    *G06F 3/06* (2006.01)
(52) U.S. Cl.
    CPC ............ *G06F 3/0635* (2013.01); *G06F 3/061* (2013.01); *G06F 3/067* (2013.01)
(58) Field of Classification Search
    CPC ......... G06F 3/0635; G06F 3/061; G06F 3/067
    See application file for complete search history.

(56) References Cited

U.S. PATENT DOCUMENTS 11,561,700 B2    1/2023   Dar et al.

OTHER PUBLICATIONS

U.S. Appl. No. 17/137,988, filed Dec. 30, 2020, entitled Techniques for Workload Balancing Using Dynamic Path State Modifications, Philippe Armangau, et al., (121699.01).

*Primary Examiner* — Nanci N Wong
(74) *Attorney, Agent, or Firm* — BainwoodHuang

(57) ABSTRACT

In at least one embodiment, processing can include: configuring a file server on a first node of a storage system, the file server including a file system configured on a volume; configuring a first path exposing the volume to the file server as active-optimized (AO) and configuring a second path exposing the volume to the file server as active-non-optimized (ANO); for the volume, while the first path's state is AO and the second path's state is ANO, determining an internode I/O workload imbalance between the first node and the second node; and responsive to determining the internode I/O workload imbalance, reducing or removing the internode I/O workload imbalance including: redirecting I/O workload of the volume from the first node to the second node over the second path by modifying the first path's state from AO to ANO and by modifying the second path's state from ANO to AO.

20 Claims, 10 Drawing Sheets

514 — Determine normalized I/O workloads (e.g., read and write workloads) for candidate file system volumes or LUNs of S that are eligible for node affinity changes. For each candidate volume or LUN in the set S, also identify the candidate's current node affinity (e.g., which path is currently designated as AO).

516 — Determine an affinity configuration or node affinity configuration for the candidate file system volumes or LUNs of S such that each of the two nodes has approximately the same number of normalized read IOPs, such as within a specified read workload difference range; and such that each of the two nodes has approximately the same number of normalized write IOPS, such as within a specified write workload difference range. The affinity configuration can model node affinity configurations for the candidate volumes of S. The affinity configuration can indicate, for each candidate volume of the set S, which node is affined to the candidate volume in the modeled node affinity configuration.

518 — In accordance with the affinity configuration, change the current node affinity for one or more selected candidate file system volumes or LUNs of S. A node affinity change for a selected candidate volume of S can include: i) configuring the path to the affined node to have a corresponding path state of AO; and ii) configuring the remaining path to the unaffined node to have a corresponding path state of ANO. The node affinity changes for the one or more selected candidates can be included in an action performed to remove or at least reduce a detected internode I/O workload imbalance between the two nodes. The action can include changing the affined node of each selected candidate volume from the first node to the second node by configuring the path to the first node as AO and configuring the remaining path to the second node as ANO.

520 — The one or more impacted file servers can be notified regarding the path state changes made based on the node affinity changes of the one or more selected candidate volumes of S. In particular, each selected candidate volume of S that had their respective node affinity changed can be associated with a respective file system included in a file server. The file server can be characterized as an impacted file server that is notified regarding the path state changes with respect to the two paths to the selected candidate volume.

FIG. 6B

TECHNIQUES FOR NODE RESOURCE BALANCING

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: configuring a first file server on a first node of a storage system, the first file server including a first file system configured on a first volume, where the storage system includes a second node; configuring multiple paths, including a first path and a second path, over which the first volume is exposed to the first file server, where said configuring multiple paths includes: configuring the first path over which the first file system of the first node issues I/Os directed to the first volume, wherein the first path is local on the first node and a first data path component of the first node services I/Os of the first volume sent over the first path; configuring the second path over which the first file system of the first node issues I/Os directed to the first volume, wherein the second path includes an interconnect between the first node and the second node so that I/Os, that are directed to the first volume and that are issued over the second path, are transmitted from the first file system to the second node where a second data path component of the second node services I/Os of the first volume sent over the second path through the interconnect from the first node to the second node; configuring a multipath layer of the first node to transmit I/Os directed to the first volume over one of the first path and the second path currently configured with a path state of active-optimized (AO); and at a first point in time, configuring the first path with respect to the first volume with a path state of AO and configuring the second path with respect to the first volume with a path state of ANO; subsequent to the first point in time while the first path with respect to the first volume is configured with a path state of AO and while the second path with respect to the first volume is configured with a path state of ANO, determining an internode I/O workload imbalance between the first node and the second node; and responsive to determining the internode I/O workload imbalance between the first node and the second node, performing first processing to reduce or remove the internode I/O workload imbalance between the first node and the second node including: at a second point in time subsequent to the first point in time, redirecting I/O workload of the first volume from the first node to the second node over the second path through the interconnect by modifying a path state of the first path from AO to ANO and by modifying a path state of the second path through the interconnect from ANO to AO.

In at least one embodiment, the internode I/O workload imbalance can be a read I/O workload imbalance that does not fall within an allowable read I/O workload difference range. A first read I/O workload of the first node can exceed a second read I/O workload of the second node by more than a threshold amount. The first read I/O workload of the first node can denote a first normalized read I/O workload of the first node based, at least on part, on a normalized or standard I/O size and a current hardware configuration of the storage system, and wherein the second read I/O workload of the second node can denote a second normalized read I/O workload of the second node based, at least in part, on the normalized or standard I/O size and the current hardware configuration of the storage system.

In at least one embodiment, the internode I/O workload imbalance can be a write I/O workload imbalance that does not fall within an allowable write I/O workload difference range. A first write I/O workload of the first node can exceed a second write I/O workload of the second node by more than a threshold amount. The first write I/O workload of the first node can denote a first normalized read I/O workload of the first node based, at least on part, on a normalized or standard I/O size and a current hardware configuration of the storage system, and wherein the second write I/O workload of the second node can denote a second normalized write I/O workload of the second node based, at least in part, on the normalized or standard I/O size and the current hardware configuration of the storage system.

In at least one embodiment, the first processing can include selecting the first volume from a candidate set of a plurality of volumes, wherein each volume in the candidate set is a dedicated file system volume configured for use by a corresponding file system of the storage system, wherein each of the volumes of the candidate set can be configured from backend non-volatile storage of the storage system. A second volume configured for use by a second file system of the storage system can be excluded from the candidate set because the second file system is I/O latency sensitive. The second file system can be included in a transactional file server wherein multiple file system operations directed to the second file system can be performed as a single transaction. A defined set of QOS (quality of service) settings can include a low QOS setting, a medium QOS setting and a high QOS setting. The QOS settings ranked in order from highest target performance to lowest target performance ca be the high QOS setting, the medium QOS setting, and the low QOS setting, and wherein each volume of the candidate set can have an associated QOS setting that is one of the low QOS setting or the medium QOS setting. The second volume can have an associated QOS setting that is the high QOS setting.

In at least one embodiment, the fir-s first processing can include, prior to said redirecting I/O workload of the first volume, performing second processing. The second processing can include: determining whether a total amount of interconnect bandwidth of the interconnect consumed, in connection with redirecting I/O workload of file system volumes between the nodes over the interconnect, would exceed a maximum bandwidth threshold if I/O workload of the first volume is redirected over the second path through the interconnect from the first node to the second node; and responsive to determining the maximum bandwidth threshold would not be exceeded if I/O workload of the first volume is redirected over the second path through the interconnect from the first node to the second node, performing said redirecting I/O workload of the first volume from the first node to the second node over the second path through the interconnect by modifying a path state of the first path from AO to ANO and by modifying a path state of the second path from ANO to AO. The second processing can include: responsive to determining the maximum bandwidth threshold would be exceeded if I/O workload of the first volume is redirected over the second path through the interconnect from the first node to the second node, determining not to perform said redirecting I/O workload of the first volume from the first node to the second node over the second path through the interconnect by modifying a path state of the first path from AO to ANO and by modifying a path state of the second path from ANO to AO.

In at least one embodiment, processing can include: receiving, at the first node from a host, a first file I/O directed to the first file system, wherein the first file system maps the first file I/G to a corresponding first block I/O directed to the first volume; and subsequent to the first point in time and prior to the second point in time, the multipath layer of the first node sending the first block I/G directed to the first volume over a selected one path of the first path and the second path having a corresponding path state of AO, where said selected one path is the first path currently having a corresponding path state of AO and where the second path has a corresponding path state of ANO and is therefore not selected by the multipath layer to transmit the first block I/O to the first volume. Processing can include: receiving, at the first node from the host, a second file I/O directed to the first file system, wherein the first file system maps the second file I/O to a corresponding second block I/O directed to the first volume; and subsequent to the second point in time when the first path has a corresponding path state of ANO and the second path has a corresponding path state of AO, the multipath layer of the first node sending the second block I/O directed to the first volume over a selected one path of the first path and the second path having a corresponding path state of AO, where said selected one path is the second path currently having a corresponding path state of AO and where the first path has a corresponding path state of ANO and is therefore not selected by the multipath layer to transmit the first block I/O to the first volume.

In at least one embodiment, processing can include: subsequent to the second point in time while the first path with respect to the first volume is configured with a path state of ANO and while the second path with respect to the first volume is configured with a path state of AO, determining a second internode I/O workload imbalance between the first node and the second node; and responsive to determining the second internode I/O workload imbalance between the first node and the second node, performing second processing to reduce or remove the second internode I/O workload imbalance between the first node and the second node including: at a third point in time subsequent to the second point in time, restoring node affinity of the first volume to the first node rather than the second node, wherein said restoring node affinity includes redistributing I/O workload of the first volume from the second node to the first node so that I/Os directed to the first volume are sent over the first path rather than over the second path through the interconnect, wherein said restoring node affinity includes modifying a path state of the first path from ANO to AO and by modifying a path state of the second path from AO to ANO.

In at least one embodiment, wherein the multipath layer can be configured to transmit I/Os directed to the first volume over any of the first path and the second path configured with a path state of active-non-optimized (ANO) only if there is no available one of the first path and the second path that is i) configured with an AO path state and ii) capable of transmitting I/Os directed to the first volume.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 6A, 6B, 7A and 7B are flowcharts of processing steps that can be performed in at least one embodiment in accordance with the techniques of the present disclosure.

DETAILED DESCRIPTION OF EMBODIMENT(S)

Figure 1:
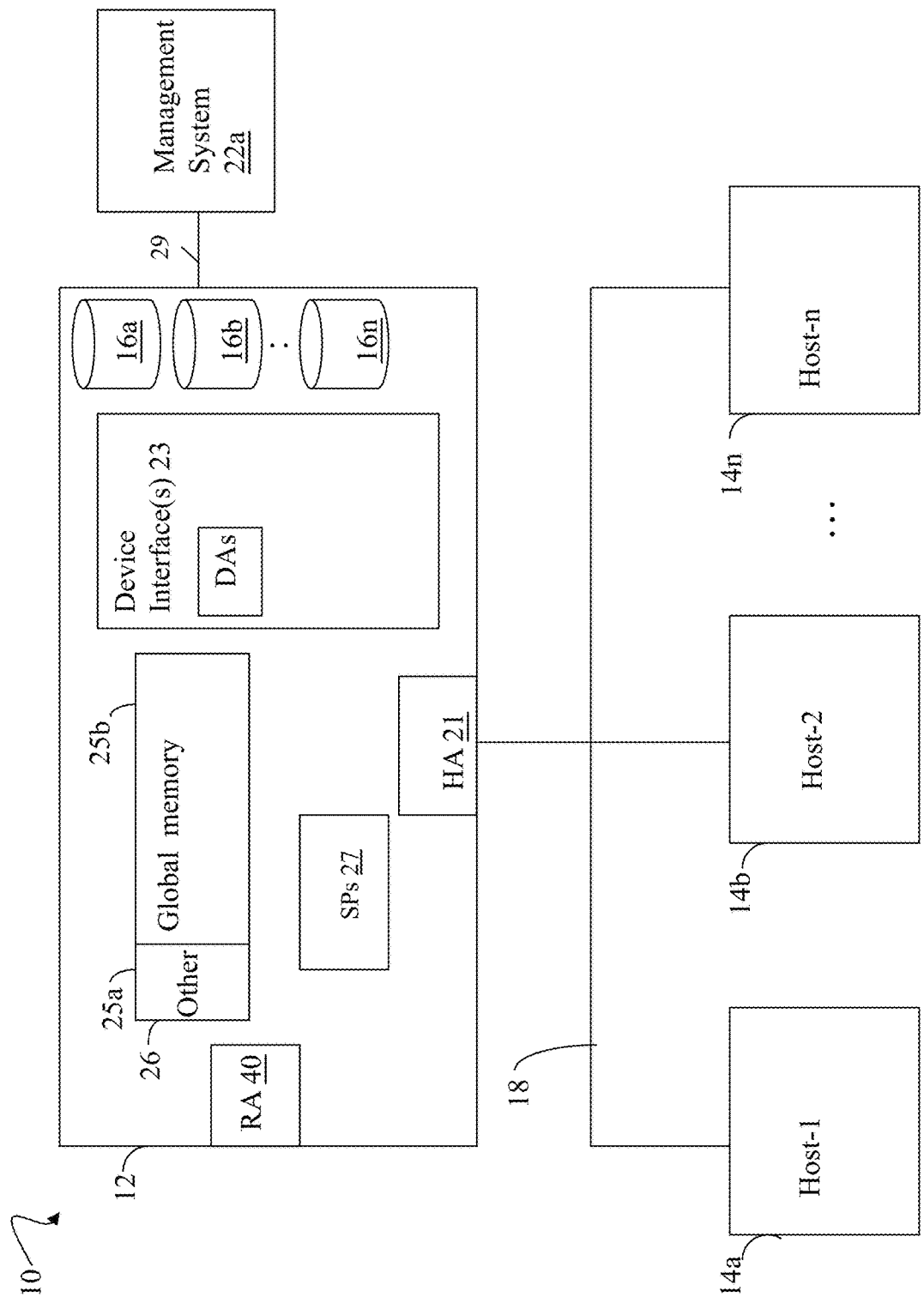
FIGS. 1, 3 and 4 are examples of components that can be included in a system in at least one embodiment in accordance with the techniques of the present disclosure.

A data storage system or appliance can include multiple file servers, such as multiple NAS (network attached storage) file servers. Each file server can potentially host multiple file systems such as, for example, tens to potentially hundreds of file systems. Since each of the file servers can have i) a varying number of file systems and ii) an unequal client I/O workload distribution, workload from the file servers can result in non-uniform resource utilization of block I/O processing on multiple nodes within the same appliance.

A file server can be the unit of mobility in various scenarios such as, for example, for remote replication failover, or for internode mobility within a single storage system or appliance. Thus to balance node resource utilization in a dual node storage system, one solution can move single file servers between nodes. In such a solution, the file server can denote the coarse workload distribution granularity where the file server and all its corresponding file systems can be collectively moved between nodes. For example, a single file server and all its file systems can be collectively moved or relocated from one node of a storage system to a second node of the same storage system in efforts to load balance between the two nodes. Such internode load balancing at the coarse granularity of per file server can have drawbacks, problems or shortcomings.

One drawback of internode load balancing at the per file server granularity is that there can be a large difference in the number of file systems per file server and/or workload of each file server such that in some scenarios, it may not be possible to achieve a balanced workload state between the two nodes of the same storage system. For example, a first node of a system can have two file servers, where one file server hosts 10 file systems and the second file server hosts 90 file systems. The second node of the same system may have no workload. Using file server granularity for node balancing and assuming each file system has about the same workload, one of the foregoing two file servers can be moved from the first node to the second node. However, in the foregoing example, no matter which file server is moved to the second node, an unacceptable internode workload imbalance can persist.

Another drawback of internode load balancing at the per file server granularity is that movement of a file server and its potentially large number of file systems between nodes can result in large workload fluctuations between the nodes. Due to the large workload fluctuations and workload variations, it can be difficult to foresee and model the impact of such a move. The foregoing large workload fluctuations between the nodes can result in system instability.

To overcome the foregoing and potentially other drawbacks, problems or shortcomings, the techniques of the present disclosure can be utilized. In at least one embodiment, the techniques of the present disclosure provide for internode workload balancing in a dual node storage system by redirecting or redistributing block I/O of selected file systems from a first node to a second node.

In at least one embodiment, rather than move an entire file server and all its file systems between nodes for internode load balancing, the techniques of the present disclosure can include redirecting block I/O of selected file systems of a file server of a first node to the peer second node. In at least one embodiment, such redirection can include making dynamic path state changes of a multi-path configuration for underlying block storage volumes configured for the selected file systems, where the redirection can use an internode communication connection or interconnect between the nodes. In at least one embodiment, such redirection of the block I/O workload of selected file systems of one or more file servers can be performed without moving or relocating any of the file servers between nodes, and without moving or relocating any of the file systems between the nodes.

In at least one embodiment, hosts and other file server clients can remain connected to the file server on the same first node while selected file systems of the file server have their block I/O redirected to a second peer node of the same storage system. In at least one embodiment, each file system can have its own dedicated volume where the file system can be mounted on, and configured on, the corresponding dedicated volume. Redirecting the block I/O workload of a file system includes effectively redirecting the file system's file-based I/O workload that corresponds to the block I/O workload of a volume upon which the file system is mounted or configured.

In at least one embodiment, redirecting the block I/O workload of one or more selected file systems provides a finer file system level of workload granularity balancing between the nodes, where such workload balancing can relate to the resulting block I/O of the selected file systems. Providing such a finer file system level of workload balancing rather than a larger and coarser file server level of workload balancing allows for better control in correcting any internode workload imbalance. Additionally, providing a finer file system level of workload balancing rather than a larger and coarser file server level of workload balancing allows for a gradual transitioning of block I/O movement from one node to another in at least one embodiment. In this manner in at least one embodiment, large instantaneous workload fluctuations can be avoided that might otherwise occur when moving entire file servers and all corresponding file systems between nodes.

In at least one embodiment, the file servers can include one or more NAS file servers. More generally, the file servers in at least one embodiment can include any suitable file server that operates in accordance with any one or more file I/O protocols.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-

14*n* and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* can issue a data request to the data storage system 12 to perform a data operation. For example, an application executing on one of the host computers 14*a*-14*n* can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16*a*-16*n*. The data storage devices 16*a*-16*n* can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14*a*-*n*. The data storage array can include one or more RAs used, for example, to facilitate communications between data storage arrays. The data storage array can also include one or more device interfaces 23 for facilitating data transfers to/from the data storage devices 16*a*-16*n*. The data storage device interfaces 23 can include device interface modules, for example, one or more disk adapters (DAs) (e.g., disk controllers) for interfacing with the flash drives or other physical storage devices (e.g., PDS 16*a*-*n*). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25*b* can be used to facilitate data transfers and other communications between the device interfaces, the HAs and/or the RAs in a data storage array. In one embodiment, the device interfaces 23 can perform data operations using a system cache included in the global memory 25*b*, for example, when communicating with other device interfaces and other components of the data storage array. The other portion 25*a* is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a*-*n* through the channels. The host systems 14*a*-*n* do not address the drives or devices 16*a*-16*n* of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
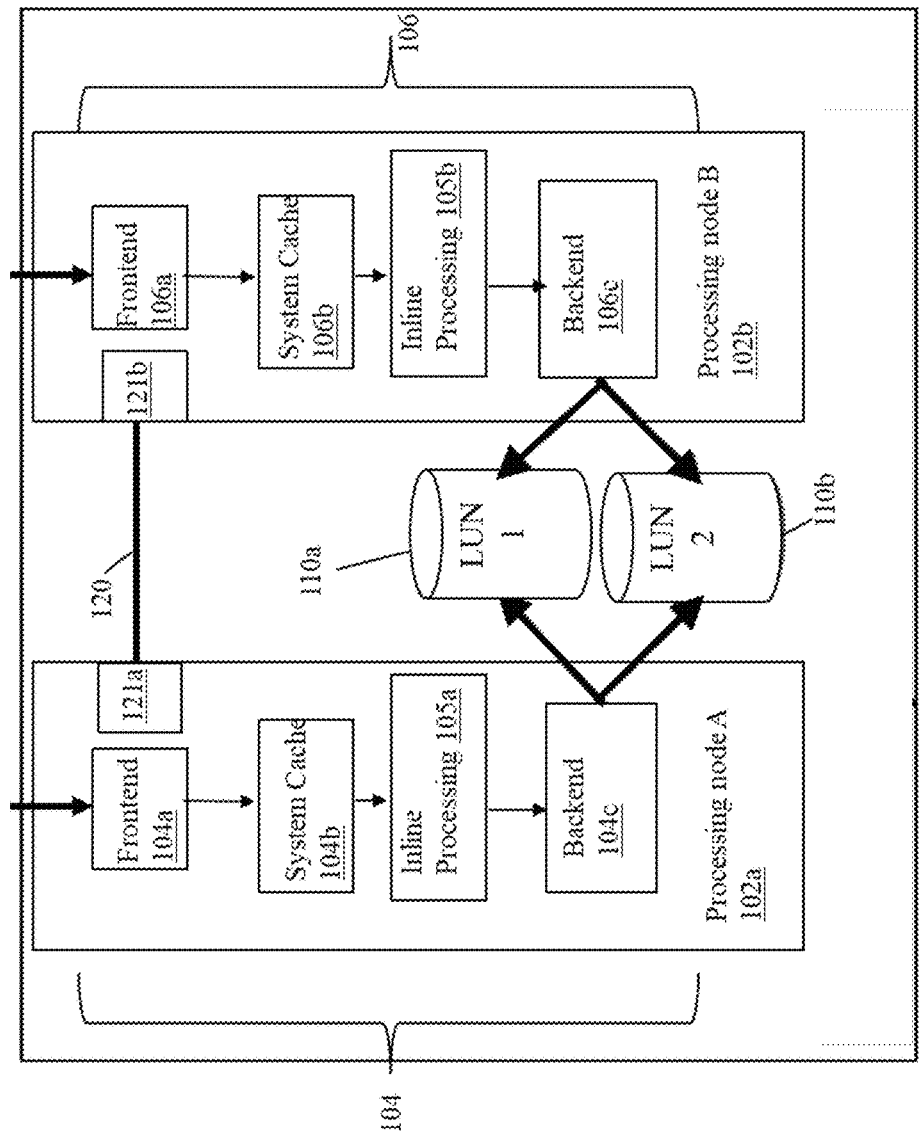
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b. In at least one embodiment, the interconnect 120 can be a network connection between a network interface 121*a* of node A and a network interface 121*b* of node B. The nodes 102*a-b* can communicate with one another over their respective network interfaces 121*a-b*. Generally, the network interfaces 121*a-b* can each include one or more network cards or adapters and/or other suitable components configured to facilitate communications between the nodes 102*a-b* over network interconnect 120.

In at least one embodiment, the network interfaces 121*a-b* can each include one or more suitable cards or adapters that support one or more of the following for communication between the nodes 102*a-b*: RDMA (Remote Direct Memory Access) over InfiniBand standard, RMDA over converged Ethernet (RoCE) standard, and/or RDMA over IP (e.g., Internet Wide-Area RDMA protocol or iWARP) standard. The network interfaces 121*a-b* can also generally denote communication interfaces that can include hardware, firmware, and/or software that facilitates communication between the nodes 102*a-b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In an embodiment in accordance with the techniques of the present disclosure, the data storage systems can be SCSI-based systems such as SCSI-based data storage arrays. An embodiment in accordance with the techniques herein can include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator and target. Thus, in accordance with the ALUA standard, various access states can be associated with a path with respect to a particular device, such as a volume or LUN. In particular, the ALUA standard defines such access states including active-optimized, active-non optimized, unavailable and other states, some of which are described herein. The ALUA standard also defines other access states, such as standby and in-transition or transitioning (i.e., denoting that a particular path is in the process of transitioning between states for a particular LUN). A recognized path over which I/Os (e.g., read and write I/Os) can be issued and serviced to access data of a volume or LUN can have an "active" state, such as active-optimized ("AO") or active-non-optimized ("ANO"). In at least one embodiment, active-optimized is an active path to a LUN that is preferred over any other path for the LUN having an "active-non optimized" state. A path for a particular LUN having the active-optimized path state can also be referred to herein as an optimized or preferred path for the particular LUN. Thus active-optimized denotes a preferred path state for the particular LUN. A path for a particular LUN having the active-non optimized (or unoptimized) path state can also be referred to herein as a non-optimized or non-preferred path for the particular LUN. Thus active-non-optimized denotes a non-preferred path state with respect to the particular LUN.

In connection with path states such as ANO and AO for a particular LUN, the path can generally be between an initiator and a target. The initiator can generally denote an initiator of a command, request, I/O, and the like; and the target can generally denote a target that receives the command, request, I/O, and the like, from the initiator. In at least one embodiment, the initiator can send a command, request, or I/O, to the target thereby requesting or instructing the target to perform or service the command, request, or I/O. Generally, I/Os directed to a LUN that are sent by the initiator to the target over active-optimized and active-non optimized paths are processed by the target. In at least one embodiment for a multi-path configuration to a volume or LUN where the configuration includes both AO and ANO paths, the initiator can proceed to use a path having an active non-optimized or ANO state for the LUN only if there is no active-optimized or AO path for the LUN.

In connection with the SCSI standard in at least one embodiment, a path can be defined between an initiator and a target as noted above. A command can be sent from the initiator, originator or source with respect to the foregoing path. The initiator sends requests to the target, destination, receiver, or responder. Over each such path, one or more LUNs can be visible or exposed to the initiator.

In at least one embodiment, the host, or port thereof, can be an initiator with respect to I/Os issued from the host to a target port of the data storage system. In this case, the host and data storage system, and ports thereof, are examples, respectively, of such initiator and target endpoints where the LUN or volume can be exposed to the initiator over the path from the target.

In at least one embodiment, the concept of path states such as AO and ANO can be further extended and used in connection with any suitable type of exposed storage object, such as, for example, one or more file systems, one or more file servers, one or more volumes or LUNs, and/or one or more vvols or virtual volumes used in connection with virtual machines.

In at least one embodiment in accordance with the techniques of the present disclosure, the initiator and target can more generally denote, respectively, any suitable initiator and target where one or more volumes or LUNs can be exposed by the target to the initiator. In at least one embodiment, a path over which multiple volumes or LUNs are exposed can be configured to a particular path state, such as AO or ANO, that varies with each individual volume or LUN. In at least one embodiment in accordance with the techniques of the present disclosure in a dual node storage system, a first path to a LUN can be local within a single node between components in a single first node of the system; and a second path to the same LUN can be between a component of the first node of the system and a component of a second node of the same system. In at least one embodiment, the first path can be between a file server (and file system thereof) of the first node and a local defined target endpoint within the first node, where the file server (and its file system) can be viewed as the initiator of the first path, and where the local defined target endpoint can be included in a software-defined SCSI target subsystem of the first node. In at least one embodiment, the second path between the two nodes can be through a network connection that is an internode communication connection such as, for example, the internal network interconnect 120 of FIG. 2. In at least one embodiment, the second path can be between a file server (and file system thereof) of the first node and a local defined target endpoint within the peer second node, where the file server (and its file system) can be the initiator of the second path, and where the local defined target endpoint can be included in a software-defined SCSI target subsystem of the second node.

Thus in at least one embodiment in accordance with ALUA where a volume or LUN is exposed to an initiator over multiple paths, an initiator can be instructed to send I/Os directed to the LUN over a first path of the multiple paths by setting the first path's state to AO and setting the remaining one or more multiple paths to have corresponding ANO states. The particular path states of the multiple paths can be communicated to the initiator. Additionally, any modifications made to such path states over time can also be communicated to the initiator so that the initiator can continue to use the AO path rather than the ANO path so long as the AO path is available to transmit and service I/Os.

It should be noted that although the concepts of initiator and target with respect to a path of an exposed volume or LUN can be applied in connection with the SCSI standard, more generally, the same concepts of initiator and target with respect to a volume or LUN exposed to the initiator over the path can also be applied and used in connection with any suitable communication standard and is not limited to the SCSI standard.

An I/O command or operation, such as a read or write operation, can be directed to a LUN and a logical address or location in the LUN's logical address space. The logical address or location of the LUN can be characterized as the target logical address of the I/O operation that is a block level I/O operation (e.g., the LUN or volume is a block device). The target logical address or location of the I/O operation of the LUN can identify an LBA within the defined logical address space of the LUN. The I/O command directed to the LUN can include various information such as identify the particular type of I/O command as read or write, identify the target logical address (e.g., LUN and LUN logical address) of the I/O command, and other information. In connection with servicing the I/O operation directed to the LUN, the target can map the target logical address of the LUN to a physical storage location on a PD of the data storage system. The physical storage location can denote the physical storage allocated or provisioned and also mapped to the target logical address of the LUN (e.g., the block level I/O device).

In at least one embodiment, the file servers can include one or more NAS file servers. More generally, the file servers in at least one embodiment can include any suitable file server that operates in accordance with any one or more file I/O protocols).

In at least one embodiment of the techniques of the present disclosure, a data storage system may provide an environment in which a software defined network attached storage (SDNAS) solution may be utilized. In such an embodiment, multiple directors may include processors upon which VMs or virtual machines execute. In at least one embodiment, the file servers of the SDNAS solution can execute in the context of the VMs.

Thus although examples in the following paragraphs can refer to a particular file server, such as a NAS file server and/or SDNAS, the techniques of the present disclosure are not limited to such examples provided for illustrative purposes. More generally, the techniques of the present disclosure can be used in connection with any suitable file server and its corresponding one or more file systems.

In at least one embodiment, each file system can have its own dedicated volume or LUN used for storing content of the file system. Put another way in at least one embodiment, each file system can be configured with its own dedicated volume or LUN, where the file system can be mounted on the file system's dedicated volume or LUN. The file system can be exposed to external storage clients, such as one or more hosts, that are externally located from the data storage system hosting the file system and its dedicated volume or LUN. Storage clients such as hosts can issue file system I/Os that are received at the storage system. The file system I/Os (e.g., directed to a particular file in the file system) can be mapped or translated into block-level I/Os directed to the file system's dedicated volume or LUN. In at least one embodiment, the file system's corresponding dedicated volume or LUN can be internal and used only internally within the storage system. The file system's dedicated volume or LUN may not be exposed externally outside the storage system to a host or other storage client. More generally, I/O and other file-based commands or operations can be mapped or translated into corresponding block-level commands or operations.

In at least one embodiment, each file server can have two multipath sessions, where each such multipath session can correspond to a different path to the same set of one or more volumes corresponding to respective file systems of the file server. For example consider a storage system with two nodes, node A and node B, with a file server running on node A, and where the file server includes a file system FS1 externally exposed to hosts or other external storage clients. The hosts or storage clients can send, to node A, file based I/Os directed to files of FS1. The file system FS1 can be configured from a first volume or LUN V1 such that the file system FS1 can be mounted on the FS1's dedicated volume or LUN V1. A host can issue file system I/Os to FS1, where such file system I/Os can be received at node A of the storage system and then mapped or translated to corresponding block level I/Os of V1. On the storage system, V1 can be exposed to the file server over two paths. A first path P1 of the two paths can be local on the node A. Block level I/Os directed to V1 sent over path P1 can utilize node A resources to process and service the block level I/Os. In particular, block level I/Os directed to V1 sent over path P1 can be serviced or processed using the data path components of node A, including the block I/O services, module or layer of node A's data path.

A second path P2 of the two paths can be a path between the node A and its peer node B. In at least one embodiment, the second path P2 can be configured over an internode network connection, internode communication connection, or interconnect between the two nodes A and B. In at least one embodiment, the interconnect can be an internal connection internal within the storage system used for internode communications between the nodes A and B. In at least one embodiment, the interconnect can be the element 120 as in FIG. 2. Block level I/Os directed to V1 sent over path P2 can be sent, redirected or redistributed from node A to node B where node B resources are used to service or process the block level I/Os. In particular, block level I/Os directed to V1 sent over path P2 can be serviced or processed using the data path components of node B, including the block I/O services, module or layer of node B's data path.

In at least one embodiment, the techniques of the present disclosure can leverage the second path P2 and, in particular, the interconnect or internode communication connection between nodes A and B, to redirect block I/O of the file system FS1 from node A to node B, as may be needed in connection with load balancing between the nodes A and B. Also as may be needed at a later point in time in at least one embodiment, the block I/O workload of the file system FS1 can also be dynamically transferred back to node A from node B. More generally in at least one embodiment, the techniques of the present disclosure can be used to dynamically shift block I/O workload of selected one or more file systems between the nodes at various points in time responsive to determined internode workload imbalances.

As discussed in more detail below in at least one embodiment, redirecting, redistributing and shifting block I/O workload of selected file systems between the nodes can be performed by i) dynamically setting or modifying the paths states of the two paths between each file server (and thus file system) and corresponding volumes or LUNs corresponding to file systems of the file server; and ii) notifying the impacted file servers, and thus file systems, regarding the path state changes. Consistent with other discussion herein in at least one embodiment, each file server can send corresponding block I/Os to each of its file system volumes or LUNs over a particular path currently configured as AO rather than ANO for the particular file system volume or LUN.

At a first point in time T1, the first path P1 can be configured as AO and the second path P2 can be configured as ANO. Consistent with other discussion herein in at least one embodiment, the currently configured AO configured path can be selected, such as by the file server, for servicing I/Os rather than the ANO configured path. In this manner at the first point in time T1, the file server can send block I/Os for file system FS1 over the AO configured path, the first path P1, where such block I/Os can then be serviced using block J/O services of node A in connection with the first path P1. At the first point in time T1, the ANO configured path P2 can be used only during high availability or HA scenarios such as, for example, where there is a failure in connection with path P1 such that block level I/Os can be issued to V1 over path P2 but not path P1. In this latter circumstance since the AO configured path P1 is not able to transmit such block level I/Os of V1 in an HA scenario, the file server including the file system FS1 can rather direct the block level I/Os of V1 over the ANO configured path P2. More generally in at least one embodiment, an ANO path can be utilized for sending I/Os rather than an AO path if the AO path is down or unable to transmit I/Os, and/or there is generally any other type of failure of the AO path and/or particular node that services I/Os sent on the AO path.

In accordance with the techniques of the present disclosure in at least one embodiment, the paths P1 and P2 can be dynamically reconfigured in connection with load balancing so that block level I/Os directed to V1 can be transmitted over the path P2 rather than the path P1 during normal processing (e.g., even when there is no HA event and/or even when I/Os can be sent over and serviced using both paths P1 and P2).

At a second point in time T2 after T1, assume that load balancing determines an imbalance in I/O workload between the node A and the node B such that the I/O workload of node A is greater than the I/O workload of node B. In response to the foregoing workload imbalance, processing can be performed to shift workload from node A to node B. In at least one embodiment, the techniques of the present disclosure can provide for shifting the block I/O workload of FS1, and thus V1, from node A to node B by modifying the path states of P1 and P2, where P1 transitions from AO to ANO, and where P2 transitions from ANO to AO. In this manner, the block I/O workload of V1 can be redirected or redistributed over the AO path P2 to node B where the block level services of the data path of node B can service block level I/Os directed to V1. Thus in scenarios where I/Os can be sent over both of the paths P1 and P2 and serviced respectively using node A and node B, in response to an internode I/O workload imbalance such as where node A's workload is larger than node B's workload, a corrective action can be performed to shift block level I/O workload from node A to node B. In at least one embodiment, the corrective action can include i) changing the path state of P2 to AO such that node B becomes the affined node for V1; and ii) changing the path state of P1 to ANO such that node A is no longer the affined node for V1. The particular file server including the file system FS1 can be notified of the path state changes. Based on the path state changes such that P2=AO and P1=ANO, the particular file server including the file system FS1 can be configured to send I/Os directed to V1 over the particular path P2 having the AO state. Consistent with discussion herein in at least one embodiment in a multipath environment where the same LUN or volume V1 is exposed to the file server and thus file system over multiple paths, I/Os directed to the exposed volume or LUN V1 can be forwarded from the file server and file system over the particular path having an AO path state. Thus in accordance with the techniques of the present disclosure, block I/O workload of V1 can be redirected or redistributed between nodes by modifying corresponding path states of the two paths over which V1 is exposed to the file system and file server. Modifying the corresponding two path states such that the particular one of the paths to the affined node is set to AO results in modifying the node affinity of V1, where the affined node then services block I/Os of V1 sent over the AO path. As may be needed, the block I/O workload of V1 can be shifted back and forth between the two nodes by modifying the path states of the two paths such that the particular path to the affined node that will handle the block I/O workload is set to AO, and the remaining second path to the unaffined node is set to ANO.

In at least one embodiment with reference back to FIG. 2, the interconnect or internode connection between nodes A and B can be a network connection that utilizes RDMA (Remote Direct Memory Access). In at least one embodiment, communications over the interconnect between nodes A and B can also be in accordance with the iSCSI (Internet Small Computer System Interface) protocol. More generally in at least one embodiment, communications over the two paths from the file server and file system to V1 can be in accordance with the SCSI standard.

In at least one embodiment, each of the nodes A and B can respectively include network interfaces 121a-b, where each network interface can further include one or more suitable cards or adapters that support inter-node communication between the nodes A and B. In at least one embodiment where the nodes A and B communicate using RDMA over the interconnect 120, the network interfaces 121a-b of the nodes A and B can operate in accordance with any one or more of: RDMA over InfiniBand standard, RMDA over converged Ethernet (RoCE) standard, and/or RDMA over IP (e.g., Internet Wide-Area RDMA protocol or iWARP) standard. The network interfaces of the nodes can also generally denote communication interfaces that can include hardware, firmware, and/or software that facilitates communication between the nodes 102a-b.

In at least one embodiment, the interconnect 120 can have at least a sufficient bandwidth capacity to accommodate use of the interconnect 120 with the techniques of the present disclosure. Although use of the inter-node path such as path P2, as discussed above and elsewhere herein, can introduce additional I/O latency due to an extra hop between nodes, in at least one embodiment the additional latency can be expected to be small or negligible within acceptable limits under specified expected steady state I/O workload conditions. In at least one embodiment, the techniques of the present disclosure can further provide for i) limiting the amount of interconnect bandwidth or utilization consumed in connection with redirecting block level I/Os of file systems in connection with load balancing; and/or ii) selecting, for block I/O redirection, only certain volumes having an I/O response time target above a specified threshold (e.g., exclude high performance volumes with low target I/O response times). By limiting the interconnect bandwidth or utilization consumption in at least one embodiment, the techniques of the present disclosure can limit any adverse impact on performance that might otherwise be incurred due to excessive or overutilization of the interconnect. By selecting particular volumes that can be characterized as lower performance, the techniques of the present disclosure in at least one embodiment can limit any adverse performance impact that might have otherwise affected selected high performance volumes.

The techniques of the present disclosure can be used in at least one embodiment in which the storage system includes file servers and their respective file systems, where storage system clients only use file-based protocols. In one such embodiment, the storage system can include file systems that are exposed to the storage client but where no block level volumes or vvols (virtual volumes used in connection with virtual machines) are stored on the storage system and used by the storage clients. The techniques of the present disclosure can also be used in at least one embodiment in which the storage system includes multiple various types of client storage objects including file systems, client block-level volumes and/or vvols. Thus generally the techniques of the present disclosure can be used in connection with one or more types of storage resources or objects including file systems to provide for more efficient and effective internode load balancing between nodes in the same system or appliance. In embodiments where a storage system or appliance has a mix of storage client resources or objects including file systems in combination with vvols and/or block-volumes or LUNs (e.g., as exposed to the client so the client issues block I/Os to the storage system), the techniques of the present disclosure allow for a finer granular movement of file system load between the nodes for improved load balancing options.

In at least one embodiment with dynamic CPU sharing where file servers and data path components can share CPU cores, the balancing of the block I/O load from file servers can be effective in performing load balancing between nodes.

In at least one embodiment, the techniques of the present disclosure can be used to redirect or redistribute block I/O of selected file systems to a peer node in connection with internode load balancing for file servers that have more than a specified threshold number of file systems. In at least one embodiment, if a file server has less than the threshold number of file systems, the file server and all its file systems can be moved from one node to another in connection with internode load balancing.

The foregoing and other aspects of the techniques of the present disclosure are described in more detail in the following paragraphs.

Figure 3:
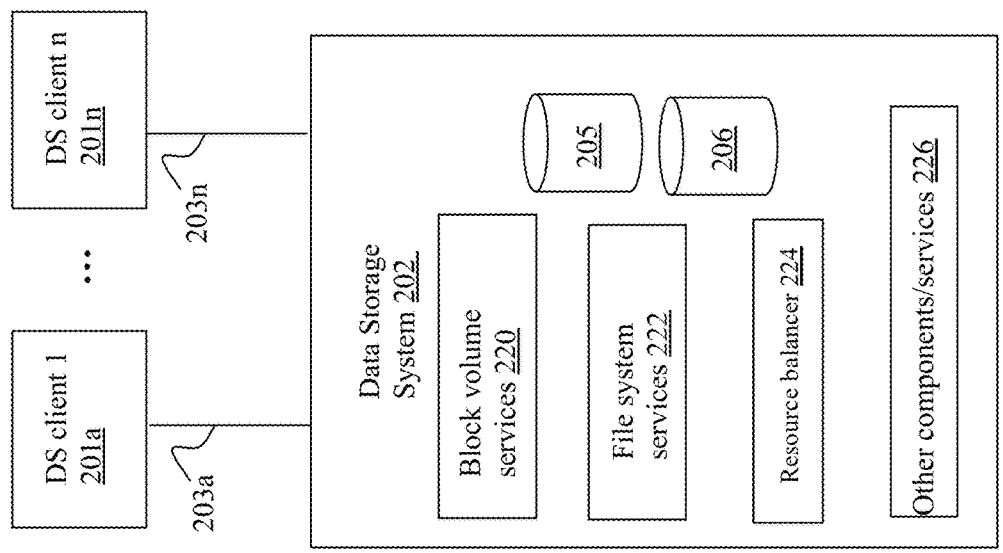

Referring to FIG. 3, shown is an example 200 of components and systems that can be included in an embodiment in accordance with the techniques of the present disclosure.

The example 200 includes the data storage system 202 communicatively coupled to "n" data storage system (DS) clients 201a-n, respectively, over the connections 203a-n. The data storage system 202 can include and provide block volume services 220 and file system services 222 to the DS clients 201a-n. The DS clients 202a-n can include, for example, hosts or applications of hosts that have their data stored on the system 202. The elements 205 and 206 can generally represent data storage objects stored locally on the system 202. For example, the elements 205, 206 can each represent a block-based storage object such as a LUN or logical device in accordance with the SCSI protocol, or can represent a file system in accordance with any suitable filed-based protocol.

The block volume services 220 can include and provide services to the clients 201a-n in connection with block-based storage objects such as, for example, LUNs or logical devices in accordance with, for example, the SCSI protocol. Additionally, as discussed in more detail elsewhere herein, the block volume services 220 can provide block level I/O services in connection with file system I/Os or file-based I/Os that are received from clients 202a-n and that are mapped to corresponding block level I/O services by a respective file system.

The file system services 222 can include and provide services in connection with file-based storage objects, such as, for example, files, directories, file systems, and the like, in accordance with one or more of file system protocols such as NFS (network file system), CIFS (common interface file system), and the like. In at least one embodiment, the file system services 222 can include one or more file servers such as one or more Network Attached Storage (NAS) servers. In at least one embodiment, each of the servers can be a file server providing file system services in connection with one or more file-based protocols. In at least one embodiment including one or more NAS file servers or servers, each NAS file server can provide file system services in connection with one or more file-based protocols such as, for example, NFS and/or CIFS. In at least one embodiment, each NAS file service or server can be SDNAS denoting a software defined version of the NAS file server or service. In such an embodiment using SDNAS, the NAS file servers can execute in the context of the VMs on the data storage system 202. The SDNAS file server or service hosted on the data storage system 202 can consume physical storage from the backend non-volatile storage devices exposed as data stores or file systems through the SDNAS file servers to the clients 201a-n which can be, for example, hosts.

The data storage system 202 can also include a resource balancer 224. In at least one embodiment, the resource balancer 224 can perform processing in accordance with the techniques of the present disclosure to determine any internode I/O workload imbalance between nodes of the storage system 202. Additionally in at least one embodiment, the resource balance 224 can also perform processing including: analyzing the detected workload imbalance, determining and selecting candidate workloads to be shifted or moved between the nodes, and implementing the shift in workload(s) among the storage system processing nodes such as by modifying desired paths states with respect to a multiple path configuration within the storage system 202

In at least one embodiment, the resource balance 224 can determine whether there is an internode read I/O workload imbalance and whether there is an internode write I/O workload imbalance. In at least one embodiment, processing performed or actions taken to reduce a detected internode I/O workload imbalance can include reducing any detected write I/O workload imbalance between the nodes and reducing any detected read I/O workload imbalance between the nodes. Techniques that can be performed to determine the current I/O workloads of the nodes and determine whether there is an I/O workload imbalance, with respect to read I/O workload and write I/O workload, are described in more detail elsewhere herein.

In at least one embodiment, the multipath configuration within the storage system 202 can expose storage system internal volumes or LUNs, which are configured for use by corresponding file systems of the storage system 202, to one or more respective file servers over multiple paths.

The clients 201a-n can issue commands or requests, respectively, over the connections 203a-n to the data storage system 202, where such commands or requests can be in accordance with any supported file-based or block-based protocols. For example in at least one embodiment operating in accordance with a SCSI protocol, the client 201a can issue a SCSI command that is a block-based I/O command to the block volume services 220 to perform an I/O operation in connection with data stored on a LUN or volume represented by the element 205. As another example, the client 201n can issue a file-based I/O command to the file system services 222 to perform an I/O operation in connection with data stored in a file of a file system represented by the element 206.

The data storage system 202 can also generally include other components and services 226 described in more detail in the following paragraphs in connection with performing the techniques of the present disclosure. The element 226 can include, for example, additional components and services of the data path and control path.

Figure 4:
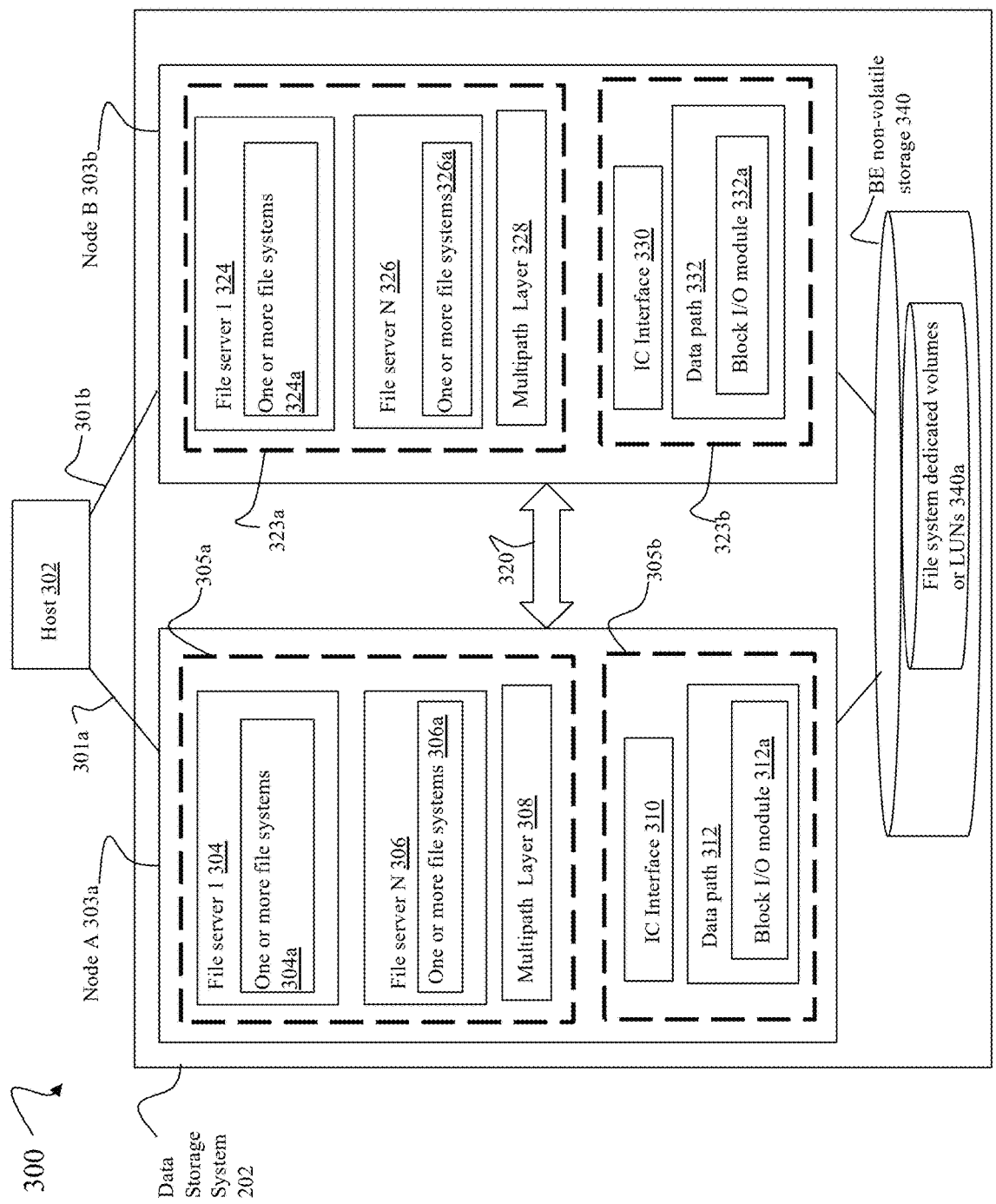

Referring to FIG. 4, shown is an example 300 of components in at least one embodiment in accordance with the techniques of the present disclosure. The example 300 provides further detail regarding components in at least one embodiment in accordance with the techniques of the present disclosure.

The example 300 includes the host 302 and data storage system 202, and provides further detail regarding the storage system 202. The host 302 is an example of a particular DS client 201a-n of FIG. 3.

The host 302 can be connected to the storage system 202 that includes the node A 303a and the node B 303b such as described, for example, generally in FIG. 2. The host 302 can be connected to node A 303a over one or more paths or connections 301a. The host 302 can be connected to node B 303b over one or more paths or connections 301b. In at least one embodiment, the host 302 and storage system 202 with nodes 303a-b can be configured in an active-active or AO-AO configuration such that the host 302 can issue commands or I/O operations to exposed storage objects over the paths 301a-b to both nodes. In at least one embodiment, the exposed storage objects can include various file systems of the nodes 303a-b discussed below. The element 320 can denote the interconnect used for internode communications between the nodes 303a-b. The element 320 can correspond to the interconnect as described, for example, also in connection with element 120 of FIG. 2.

The node 303a can host N file servers, where N can generally be any suitable number of one or more file servers. In the example 300, the node 303a can host file servers including: the file server 304 with one or more file systems 304a; and the file server 306 with one or more file systems 306a. Consistent with discussion elsewhere herein, the host 302 can send, over connection 301a, file-based I/Os to one or more file systems such as the file system 304a of file server 304 on node 303a, where such file-based I/Os can be mapped or translated by the file system 304a into block-level or block I/Os directed to the particular dedicated volume or LUN configured for the file system 304a. In at least one embodiment, the volume or LUN of the file system 304a can be an internal volume or LUN exposed to the file server 304 (and file system 304a), where the internal volume or LUN can be configured from storage of the BE non-volatile storage 340. Element 340a can denote the file system dedicated volumes or LUNs each configured for a corresponding file system. In at least one embodiment, each file system volume or LUN 340a of a respective file system of a corresponding file server can be exposed to the file server (and file system) over two paths. Thus, the node 303a can also include a multipath layer 308 that can include a multipath driver of the runtime stack that handles sending block level I/Os of the file system volumes or LUNs 340a over the two paths for corresponding file systems of the node 303a.

In at least one embodiment, the N file servers 304, 306 and their respective file systems, and the multipath layer 308 can be included in an SDNAS container 305a including functionality needed for software-defined NAS file servers using the NAS protocol.

The node 303a can also include an IC (interconnect communication) interface 310, and a data path component 312. The IC interface 310 can be used by the node 303a to communicate with its peer node 303b over the interconnect 320. The data path 312 can generally include one or more modules or other components of the data path on the node 303a. The data path 312 can include a block I/O module 312a that performs block level I/O processing. For example, the block I/O module 312a can service block level I/Os received from the host 302 where such I/Os can be directed to a client volume or LUN exposed to the host 302 over the paths 301a, 301b. As another example, the block I/O module 312a can service block I/Os received from the file servers 304, 306 and their respective file systems for file-based I/Os that are mapped or translated to such corresponding block I/Os.

In at least one embodiment, IC interface 310 and the data path 312 can be included in a BSC or base storage container (305b) of components.

The node 303b can be configured in a manner similar to the node 303a. The node 303b can host N file servers, where N can generally be any suitable number of one or more file servers. In the example 300, the node 303b can host file servers including: the file server 324 with one or more file systems 324a; and the file server 326 with one or more file systems 326a. Consistent with discussion elsewhere herein, the host 302 can send, over connection 301b, file-based I/Os to one or more file systems such as the file system 324a of file server 324 on node 303b, where such file-based I/Os can be mapped or translated by the file system 324a into block-level or block I/Os directed to the particular dedicated volume or LUN configured for the file system 324a. In at least one embodiment, the volume or LUN of the file system 324a can be an internal volume or LUN exposed to the file server 324 (and file system 324a), where the internal volume or LUN can be configured from storage of the BE non-volatile storage 340. In at least one embodiment, each file system volume or LUN 340a of a respective file system of a corresponding file server can be exposed to the file server (and file system) over two paths. Thus, the node 303b can also include a multipath layer 328 that can include a multipath driver of the runtime stack that handles sending and receiving block level I/Os of the file system volumes or LUNs 340a over the two paths for corresponding file systems of the node 303b.

In at least one embodiment, the N file servers 324, 326 and their respective file systems, and the multipath layer 328 can be included in an SDNAS container 323a.

The node 303b can also include an IC interface 330, and a data path component 332. The IC interface 330 can be used by the node 303b to communicate with its peer node 303a over the interconnect 320. The data path 332 can generally include one or more modules or other components of the data path on the node 303b. The data path 332 can include a block I/O module 332a that performs block level I/O processing. For example, the block I/O module 332a can service block level I/Os received from the host 302 where such I/Os can be directed to a client volume or LUN exposed to the host 302 over the paths 301a, 301b. As another example, the block I/O module 332a can service block I/Os received from the file servers 324, 326 and their respective file systems for file-based I/Os that are mapped or translated to such corresponding block I/Os.

In at least one embodiment, IC interface 330 and the data path 332 can be included in a BSC or base storage container (323b) of components.

In at least one embodiment, each file server can have its own IP addresses published and used by the host 302 or other storage client to access the file system(s) of the file server. In at least one embodiment, each file server can have its own defined policies including, for example, a QOS (quality of service) policy, and snapshot policy. The QOS policy of the file server can specify, for example, target performance goals with respect to file systems of the particular file server such as, for example, a target I/O response range with respect to host file-based I/Os directed to file systems of the file server. The snapshot policy of the file server can specify, for example, a frequency that local snapshots are taken by the data storage system of file system volumes corresponding to file systems of the file server.

In at least one embodiment, containers such as the SDNAS containers 305a, 323a and BSC containers 305b, 323b can be used in connection with resource management within the storage system 202. For example in at least one embodiment, system resources such as a number of CPU cores, an amount of memory, and the like, can be allocated for use by each particular container. In at least one embodiment, the container-based resources of a container can then be further partitioned for use among components within each container In at least one embodiment, the host 302 and the storage system 202 can operate in accordance with the ALUA protocol where the connections or paths 301a-b can have associated path states for storage objects exposed to the host 302 by the storage system 202 over such paths 301a-b. For example at least in an initial configuration, the file systems of the file servers 1-N 304, 306 running on node A 303a can have the path 301a set to AO, and the path 301b set to ANO; and the file systems of the file servers 1-N 324, 326 running on node B 303b can have the path 301b set to AO, and the path 301a set to ANO.

What will now be described is an example illustration of the techniques of the present disclosure in connection with FIGS. 5A and 5B. In the below description with FIGS. 5A and 5B, further details are provided in connection with the file system FS1, its corresponding LUN or volume V1, and the two paths P1 and P2 as generally discussed above.

Figure 5A:
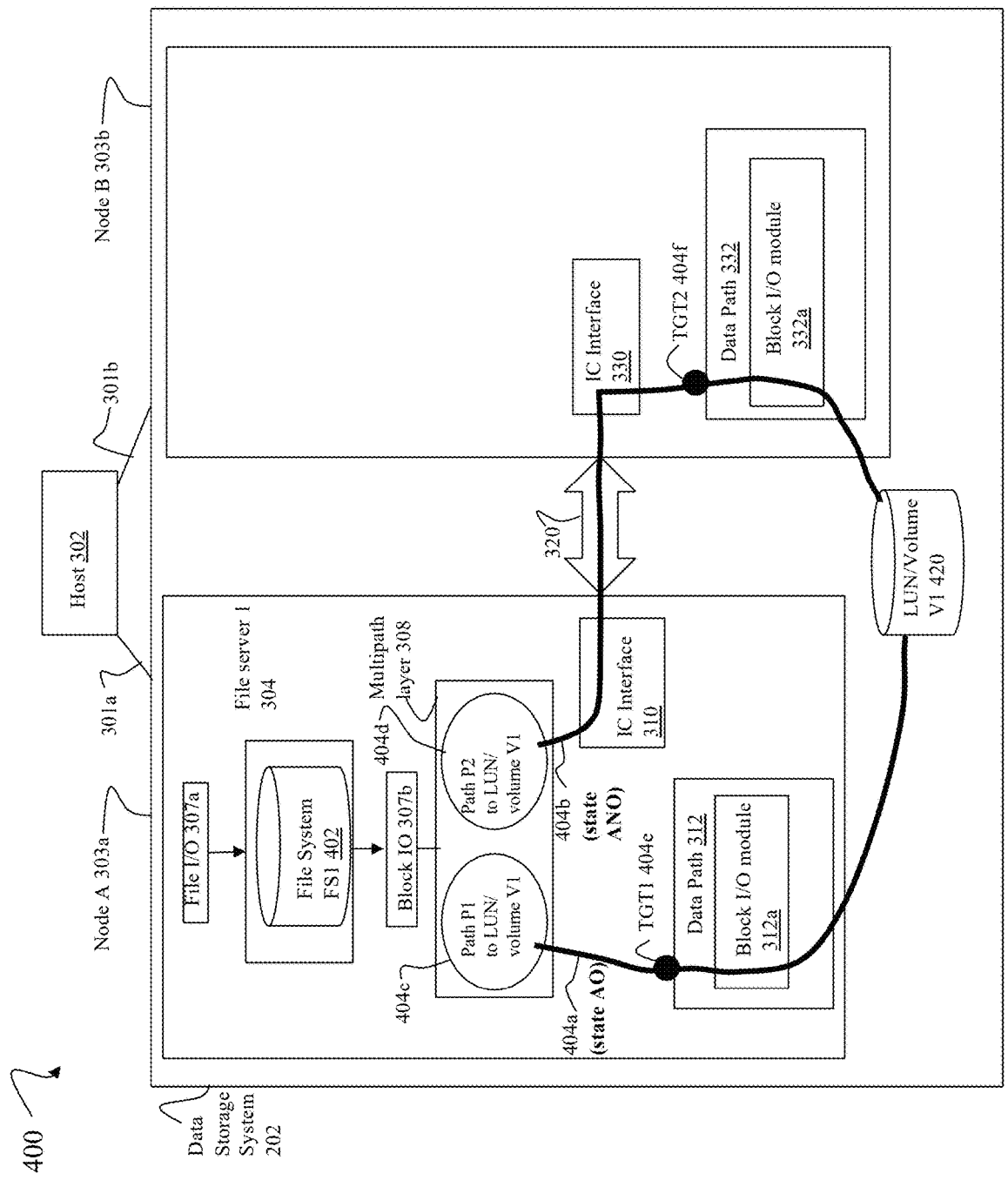
FIGS. 5A and 5B are examples illustrating path states of paths to file system volumes within a storage system in at least one embodiment in accordance with the techniques of the present disclosure.

In FIG. 5A, the volume V1 420 configured for the file system FS1 402 of node A can be affined to node A. In FIG. 5B, the volume V1 420 configured for the file system FS1 402 of node A can be affined to the peer node B. As discussed below in more detail, the change in node affinement for V1 can be performed in response to detecting an internode workload imbalance. The node affinement change can be implemented by modifying the path states of the two paths P1 and P2 to V1. In particular, in FIG. 5A where V1 is affined to node A before the change, the AO path for V1 is the particular path P1 to node A, and the ANO path for V1 is the remaining particular path P2 to node B. In FIG. 5B after modifying the path states for paths to V1, the AO path for V1 is the particular path P2 to node B, and the ANO path for V1 is the remaining particular path P1 to node A.

Referring to FIG. 5A, shown is an example 400 illustrating the host 302 and various layers and components on the nodes 302a-b in connection with data flow when servicing host I/Os in at least one embodiment in accordance with the techniques of the present disclosure.

The example 400 provides yet further detail in at least one embodiment in accordance with the techniques of the present disclosure with only a single file system of a single file system of a single node for illustration. More generally, the techniques can be applied for use in connection with multiple file systems of multiple file servers on one or both nodes.

The example 400 includes elements of components similarly numbered as in FIG. 4. In the example 400, the file server 304 includes the file system FS1 402 mounted and configured on a corresponding file system volume or LUN V1 420. The volume or LUN V1 420 can be exposed to the file server 304, and thus file system 402, over two paths P1 and P2. The path P1 is denoted by the solid line 404a representing one path over which the volume V1 420 is exposed and available to the file server 304/file system 402. The path P2 is denoted by the solid line 404b representing another path over which the volume V1 420 is exposed and available to the file server 304/file system 402.

Element 307a illustrates a file-based I/O that is received from the host 302 over connection 301a. The file I/O 307a can be a file I/O directed to the file system FS1 402 of the file server 304. The file I/O 307a can be mapped, by the file system FS1 402, to a corresponding block I/O 307b that is further passed down the runtime stack of components to the multipath layer 308 of node A 303a. The block level I/O 307a is then further transmitted over a selected one of the two paths 404a-b for servicing or processing.

In at least one embodiment, the file system FS1 402 of the file server 1 304 running on node A 303a can have the path 301a set to AO, and the path 301b set to ANO. In this manner, the host 302 can send file I/Os directed to FS1 402 over the AO path 301a. Put another way, the host 302 can include a multipath driver or layer similar to the multipath layer 308 discussed elsewhere here that selects to send I/Os directed to a storage object over an available AO path. In such an embodiment, the host 302 may only send I/Os directed to the storage object, such as FS1 402, over an ANO path, such as 301b, only if there are no available, functional and working AO paths for the storage object, such as FS1 402.

In at least one embodiment, the path P1 404a can be between the endpoints 404c and TGT1 404e, where 404c can be an initiator endpoint and TGT1 404e can denote a target endpoint. With respect to the path P1 404a, the file server 304 (and thus file system 402) can be the initiator with respect to sending commands, requests and operations to the data path 312 of node A, where the data path 312 of node A can be the target that services or processes the received commands, requests and operations received from the initiator, the file server 304 over path P1 404a. In at least one embodiment, the target endpoint 404e can be a local defined target endpoint within node A 303a. In at least one embodiment, the local defined target endpoint TGT1 404e can be included in a software-defined SCSI target subsystem of node A 303a.

In at least one embodiment, the path P2 404b can be between the endpoints 404d and TGT2 404f, where 404d can be an initiator endpoint and TGT2 404f can denote a target endpoint. With respect to the path P2 404b, the file server 304 (and thus file system 402) can be the initiator with respect to sending commands, requests and operations to the data path 332 of node B, where the data path 322 of node A can be the target that services or processes the received commands, requests and operations received from the initiator, the file server 304 over path P2 404b. In at least one embodiment, the target endpoint 404f can be a local defined target endpoint within node B 303b. In at least one embodiment, the local defined target endpoint TGT2 404f can be included in a software-defined SCSI target subsystem of node B 303b.

Thus the path P1 404a denotes a path that is local on the node A; and the path P2 denotes a path through the interconnect 320 from node A 303a to the peer node B 303b.

The multipath layer 308 can be included in the runtime stack on node A 303a and can handle selecting one of the two paths P1 404a, P2 404b for sending block I/Os to the volume V1 420. In at least one embodiment, the multipath layer 308 can select one of the paths 404a, 404b over which to send block level I/Os to V1 based, at least in part, on the that particular one of the paths 404a, 404b that is set to AO.

The FIG. 5A can represent the state of the storage system 202 at the first point in time T1 as described above. In particular at the time T1, the path P1 404a to volume V1 420 can be configured to have the path state of AO; and the path P2 404*b* to the volume V1 420 can be configured to have the path state ANO. In at least one embodiment, the multipath layer 308 can select which one of the two paths 404*a-b* over which to send I/Os directed to the volume V1 420 based on the particular path states of the paths 404*a-b* at a point in time. Consistent with other discussion herein in at least one embodiment, the multipath layer 308 can send the I/Os directed to V1 420 over a path having an AO state, and can only send the I/Os over a path having the ANO state when there are no available working AO paths over which to send the I/Os. Thus at time T1, I/Os directed to V1 420 can be sent over path P1 404*a* where such I/Os are then serviced locally on node A using node A's data path 312. In particular, the I/Os directed to V1 420 can be block level I/Os that are serviced or processed by the block I/O module 312*a* of node A. Any replies or responses to the I/Os can be returned back along the path P1 404*a* from the data path 312 of node A, to the multipath layer 308 and to the file server 304. At the first point in time T1, the volume V1 420 can be affined to node A 303*a* where the path P1 404*a* is configured to the AO path state thereby resulting in the multipath layer 308 sending block I/Os directed to V1 420 over the AO path P1 404*a* (rather than the ANO path 404*b*) such that the data path 312 of node A services the I/Os sent over the path P1 from the file server 304.

At a second point in time T2 subsequent to T1, an internode I/O workload imbalance can be determined between the nodes 303*a-b* such as by the resource balancer 224 of FIG. 3. For example, node A 303*a* can have a much larger workload, such as much larger read I/O workload and/or a much larger write I/O workload, than node B 303*b*. In response to the detected workload imbalance between the nodes 303*a-c*, the resource balancer 224 can further recommend shifting the block I/O workload of the volume V1 420 used by the file system FS1 402 from the node A 303*a* to the node B 303*b*. In at least one embodiment, the foregoing shifting of the block I/O workload of V1 420 from node A 303*a* to the node B 303*b* can be denoted by changing the node affinity of V1 420 from node A 303*a* to node B 303*b* such that the path P2 404*b* to node B 303*b* becomes the AO path, and such that the path P1 404*a* becomes the ANO path.

Figure 5B:
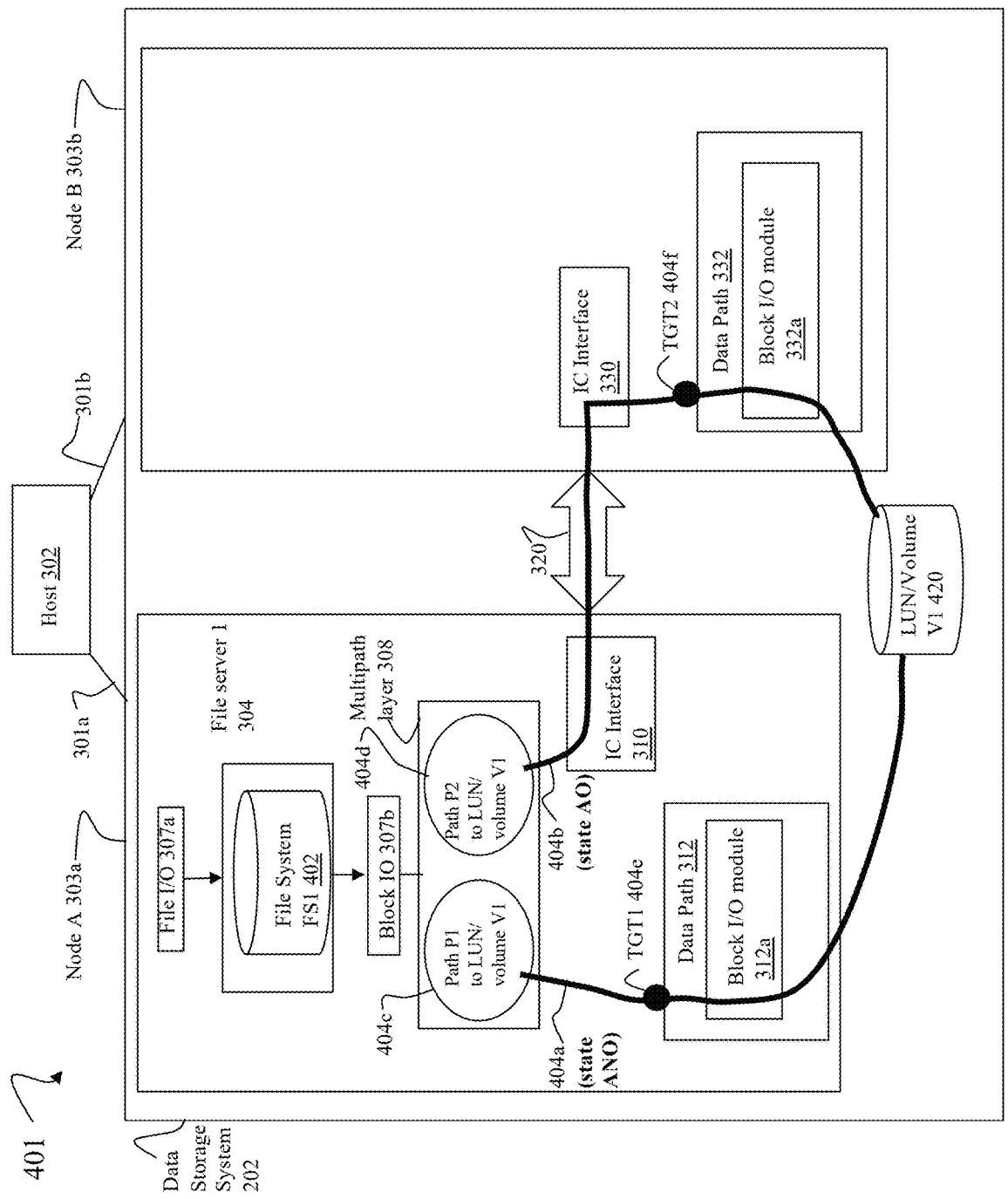

Referring to FIG. 5B, shown is an example 401 illustrating the state of the storage system at the second point in time T2 where the path P1 404*a* transitions from the AO path state to the ANO path state, and where the path P2 404*b* transitions from the ANO path state to the AO path state. FIG. 5B includes the same components as in FIG. 5A with the difference that in FIG. 5B, the path P1 404*a* is configured to the ANO path state and the path P2 404*b* is configured to the AO path state. The impacted file server 304 that includes the file system FS1 402 corresponding to the volume V1 420 can be notified of the path state changes with respect to the paths 404*a-b* for the volume V1 420.

Due to the path state change at the second point in time T2 as denoted in FIG. 5B where the path P2 404*b* is configured to AO and the path P1 404*a* is configured to ANO with respect to the volume V1 420, the multipath layer 308 sends the file server 304's subsequent block level I/Os directed to V1 420 over the AO path P2 404*b* rather than the ANO path P1 404*a*. Such block level I/Os transmitted over P2 404*b* are sent over the interconnect 320 to the node B 303*b*, where the block level I/Os are received by the target endpoint TGT2 404*f*, and then serviced or processed by the data path 332 of node B.

In at least one embodiment at time T2, the multipath layer 308 can select which one of the two paths 404*a-b* over which to send I/Os directed to the volume V1 420 based on the particular path states of the paths 404*a-b*. Consistent with other discussion herein in at least one embodiment, the multipath layer 308 can send the I/Os directed to V1 420 over a path having an AO state, and can only send the I/Os over a path having the ANO state when there are no available working AO paths over which to send the I/Os. Thus at time T2, I/Os directed to V1 420 can be sent over path P2 404*b* where such I/Os are then serviced locally on node B using node B's data path 332. In particular, the I/Os directed to V1 420 can be block level I/Os that are serviced or processed by the block I/O module 332*a* of node B. Any replies or responses to the I/Os can be returned back along the path P2 404*b* from the data path 332 of node B, to the multipath layer 308 and to the file server 304. At time T2, the volume V1 420 can be affined to node B 303*b* where the path P2 404*b* is configured to the AO path state thereby resulting in the multipath layer 308 sending block I/Os directed to V1 420 over the AO path P2 404*b* (rather than the ANO path 404*a*) such that the data path 332 of node B services the I/Os sent over the path P2 from the file server 304 of node A To further and more completely illustrate processing in at least one embodiment, consider the following scenario after configuring path P1 404*a* to ANO and path P2 404*b* to AO at time T2. The host 302 sends first file-based I/Os directed to file system FS1 402, where the first file-based I/Os are sent over connection 301*a* to node A 303 and received by the file server 304*a* of the node A 303*a*. The first file-based I/Os can be mapped or translated, such as by FS1 402, to corresponding block level I/Os directed to V1 420. The block level I/Os can be sent from DS1 402 to the multipath layer 308 that chooses to send the block level I/Os over the path P2 404*b* to node B since the path P2 404*b* is currently configured as the AO path for V1 420. The block level I/Os are redirected or redistributed from node A to node B over the AO path P2 404*b* and received by the endpoint TGT2 404*f* of node B and then processed by the data path 332 of node B. In this manner, the techniques of the present disclosure provide for moving or shifting the block I/O workload of V1 420 from node A to node B for the single file system FS1 402.

Thus using the techniques of the present disclosure by changing the path state of P2 404*b* to AO and changing the path state of P1 404*a* to ANO at time T2, the block level I/O processing for V1 420 is moved or shifted from node A to node B where such block level I/Os are processed using resources of node B (e.g., the data path 332 of node B) rather than node A. The foregoing block level I/O workload shift for a single file system can be performed without moving or relocating the corresponding file server 304 and any other file systems of the file server 304 between the nodes. The foregoing allows the host 302 to continue to send its file-based I/Os directed to FS1 402 to the same node A 303*a* while the storage system 202 shifts the file system FS1's block level I/O workload of V1 420 from node A to node B, and where the shift in block level I/O workload is performed transparently from the perspective of the host 302.

In at least one embodiment at time T2, for data storage system internal volumes such as the volume V1 420, the various data services performed with respect to the V1 420 can be performed by the particular node affined to V1 420 at various points in time. The data services can include, for example, snapshot creation, snapshot deletion, asynchronous replication, and the like. For example, at time T1 where V1 420 is affined to node A 303*a*, node A 303*a* can handle any needed data services for V1 420; and at time T2 where V1 420 is affined to node B 303*b*, node B 303*b* can handle any needed data services for V1 420.

In at least one embodiment, in response to an internode I/O workload imbalance, a corrective action can be performed that includes shifting the I/O workload of a specified limited number of file system LUNs or volumes between the nodes in efforts to remove or at least reduce the detected I/O workload imbalance. Put another way, even though movement of workload of more than the specified number of volumes may be needed to eliminate or remove the I/O workload imbalance, at each of multiple points in time, workload of only the specified number of volumes can be shifted so as to avoid large changes or fluctuations in node workload. For example, a workload imbalance between nodes A and B can be determined as noted elsewhere herein where node A's workload can be much larger than node B. At a first point in time T11, block level I/O workload of only a specified number, such as 3, file system LUNs of volumes can be shifted from node A to node B in accordance with the techniques of the present disclosure by modifying paths states for the 3 volumes to be affined to node B rather than node A. At a second point in time T12 after T11, the current I/O workloads of nodes A and B can again be measured and compared to determine whether there is an internode workload imbalance. At time T12, processing can again determine that the workload of node A is still much larger than node B. In response I/O workload of up to another 3 file system LUNs or volumes can be shifted from node A to node B in accordance with the techniques of the present disclosure by modifying paths states for the 3 volumes to be affined to node B rather than node A. The foregoing shifting of workload of each set of up to 3 volumes can be performed rather than, for example, shifting a much larger the workload of 6 or more volumes at the same point in time in order to avoid large fluctuations and/or changes in node-level workloads. In at least one embodiment, the workload of each file system and thus each file system's corresponding block I/O level workload can dynamically change and vary over time. Thus it can be difficult to accurately predict or model the total collective impact of the expected node-level workloads due to shifting larger workloads of many file systems between the nodes. As such in at least one embodiment, processing can alternatively shift smaller amounts of workload at multiple points in time between the nodes as may be needed to address detected internode I/O workload imbalances.

In at least one embodiment, I/O workload information can be collected for the file systems and corresponding volumes at defined time periods intervals such as every 30 minutes. Also at each time interval of 30 minutes, processing can be performed to determine whether there is any internode workload imbalance between nodes A and B, and if so, select up to a specified number of file system volumes to have their workload shifted between the nodes in efforts to reduce any detected internode load imbalance.

In at least one embodiment, one or more criteria or considerations can be used in connection with selecting file volumes or LUNs for affinity changes to implement a block level I/O workload shift between the nodes in the storage system. An embodiment can generally include one or more of the criteria or conditions discussed below and elsewhere herein.

In at least one embodiment, the criteria can include a first condition that candidate volumes eligible for block I/O workload redirection or redistribution among the nodes belong to a file server having at least a minimum number of file systems. For example, the minimum number can be 5 such that file system volume candidates can be selected from file servers having 5 or more file systems. In at least one embodiment, actions for internode workload balancing can include redirecting or redistributing block-level I/O workload of one or more selected file systems, alone or in combination with, movement or relocation of a file server and its file systems between nodes. In at least one embodiment, file servers having the less than the minimum number of file systems can be a candidate for movement or relocation from one node to the peer node as part of the solution or actions implemented for internode workload balancing. Such a file server having a few number of file systems, such as fewer than the specified minimum number can be characterized as easier to assess in terms of the workload impact. In at least one embodiment, it can be desired to keep the file server and all block level I/O processing local in the same node where such file server candidates having less than the minimum number of file systems can be candidates for relocation as a collective unit from one node to another. In contrast in at least one embodiment, file servers having the minimum number of file systems or more can be candidates for having individual file system volume workload redirected or redistributed between the nodes providing a finer level of granularity at the file system/file system volume level for internode workload balancing.

When block level I/O corresponding to a pending host file I/O is redirected over the interconnect between the nodes, block level I/O latency and thus host file I/O latency can increase. When additional latency is of concern, certain file system volumes can be excluded from the set of candidates considered or internode I/O workload balancing. By doing so, such file system volume associated with latency sensitive I/Os can remain local to the host where the corresponding file server is located. In at least one embodiment, the criteria can include a second condition that file system volumes that are latency sensitive be excluded from the candidate volumes eligible for block I/O workload redirection or redistribution between the nodes. In at least one embodiment, the criteria can include a third condition that file servers that are latency sensitive having their corresponding file system volumes excluded from the candidate volumes eligible for block I/O workload redirection or redistribution between the nodes. For example with reference back to FIG. 4, if file server N 306 hosts file systems 306a that are latency sensitive, then volumes for such file systems 306a of file server N can be excluded from the set of candidate volumes eligible for block I/O workload redirection or redistribution among the nodes.

In at least one embodiment, file servers and/or file systems characterized as transactional can have corresponding file system volumes excluded from the candidate volumes eligible for block I/O workload redirection or redistribution between the nodes. In at least one embodiment, such transactional file systems and/or file servers can also be latency sensitive. In at least one embodiment, a file server and/or file system can be characterized as transactional wherein multiple file system operations directed to a corresponding file system can be performed as a transaction. In at least one embodiment, the criteria can include a fourth condition that a file system volume corresponding to a transaction file server and/or file system be excluded from the candidate volumes eligible for block I/O workload redirection or redistribution between the nodes.

In at least one embodiment, file system volumes can have an associated QOS setting selected from one of a set of defined QOS setting. In at least one embodiment, the set of defined QOS settings can include low, medium and high, where high denotes the highest relative performance ranked QOS setting of the set; medium denotes the second or middle relative performance ranked QOS setting and low denotes the lowest relative performance ranked QOS setting of the set. In at least one embodiment, the criteria can include a fifth condition that file system volumes having an associated QOS setting of high be excluded from the candidate volumes eligible for block I/O workload redirection or redistribution between the nodes. In at least one embodiment, the various QOS settings can denote different performance levels such as with respect to host I/Os where the high QOS setting for a file system volume can denote that the storage client, such as the host, has a high performance target with a low first target I/O response time RT1. The medium QOS setting can have a second target I/O response time RT2>RT1. The low QOS setting can have a third target I/O response time RT3>RT2.

In at least one embodiment, the criteria can include a sixth condition that, from eligible candidate file system volumes eligible for block I/O workload redirection, priority is given to file system volumes of file systems in efforts to co-locate the file server and the corresponding block level I/O workload of its file systems on the same node. Thus in such an embodiment, affinity changes for file system volumes can be selected such that co-location of file servers and corresponding file system volume workloads is given the highest selection priority while maintaining the internode I/O workload balance between the nodes. That is in at least one embodiment, file system volume node affinity selection can be optimized such that each file server uses minimum interconnect bandwidth while also maintaining an internode workload balance where the nodes are processing nearly equal I/O workloads.

In at least one embodiment, the storage system, and nodes thereof, can track a set of which file system volume I/O workloads are sent over the interconnect as a result of block I/O workload redirection via node affinity changes. When selecting file system volumes to have their node affinities changed as part of internode workload balancing, priority can be given to evaluating the set to determine whether reversing or modifying a corresponding node affinity for such a file system volume of the set can be performed as part of the internode I/O workload balancing. For example reference is made to FIGS. 5A and 5B. Assume that processing is at a third point in time T3 after redirecting the block I/O workload of V1 420 from node A to node B by performing the path state modifications such that path P1 404a=ANO and path P2 404b=AO (e.g., changing the node affinity for V1 420 from node A to node B). At time T3, assume that now there is an I/O workload imbalance where the I/O workload of node B is greater than the I/O workload of node A, where processing can be performed to select one or more file system volumes currently affined to node B to be reaffined to node A. Put another way, the processing at time T3 can select one or more file system volumes currently having their block I/O workload serviced by node B to alternatively be serviced by node A. In accordance with the techniques of the present disclosure in at least one embodiment, such node reaffinement and shifting of block level I/O workload of a file system volume can be performed by modifying corresponding path states. The processing can give priority to selecting eligible file system volumes that have their block level I/O workload redirected from node A to node B over the interconnect 320. Such priority can be given over other eligible file system volumes that do not have their block level I/O workload redirected over the interconnect. In at least one embodiment, processing at T3 can select a file system volume, such as V1 420, that currently has its block I/O workload redirected over the interconnect 320 as a result of a prior workload redirection and prior node affinity change to node B. To shift block I/O workload processing from node B to node A due to the internode workload imbalance of node B having a larger I/O workload than node A, processing at T3 can select V1 420 to reverse the prior node affinity change so that the node affinity for V1 420 is restored from node B back to node A (e.g., as at time T1 in FIG. 5A). In this manner at time T3, V1 420 can be affined to the same node, node A, as the node upon which the corresponding file system FS1 402 and file server 304 execute. Put another way, priority can be given to perform affinity node changes for file system volumes to be affined to the same node as its corresponding file server and file system. The foregoing can be performed in at least one embodiment to reduce any adverse impact on the cumulative bandwidth of the interconnect that is consumed by the file server block I/O traffic redirected over the interconnect.

In at least one embodiment, to limit the impact on I/O performance of using the interconnect 320, a predefined or predetermined limit or threshold can be specified regarding how much of the interconnect bandwidth capacity or capability can be used in connection with block I/O workload redirection between the nodes for redirected block I/O workloads of file system volumes of the file servers of nodes A and B. In at least one embodiment, bandwidth utilization of the interconnect 320 between the nodes can be monitored. Before redirecting or rerouting additional block level I/O workload over the interconnect 320 in accordance with the techniques of the present disclosure, processing can be performed to determine whether the current bandwidth utilization level, or the projected bandwidth utilization level after redirecting block level I/O workload, of the interconnect 320 exceeds a maximum allowable threshold level. If so, the redirection or rerouting of block level I/O workload may not be performed; and otherwise, the desired redirection or rerouting of block level I/O workload can be performed. To further illustrate, assume the interconnect bandwidth capability or maximum bandwidth is 100 GBs/second. In at least one embodiment, a bandwidth threshold can be selected such as, for example, 50 GBs/second. The bandwidth threshold can denote a portion of the interconnect bandwidth capacity or capability that is allows to be consumed in connection with redirecting block level I/O workload traffic of file system volumes over the internode interconnect 320. Processing can be performed to determine whether the current bandwidth utilization or projected bandwidth utilization after redirecting a particular block level I/O workload exceeds 50 GBs/second. If so, then the redirection is not performed; otherwise the redirection can be performed.

In at least one embodiment, file system volume I/O workloads of file systems of a file server can be redirected from a first node to a second node as part of internode workload balancing. The file system volume workloads can be redirected, such as from node A to node B, over the interconnect 320 as a result of multiple workload redirections at multiple different points in time in connection with finally also physical relocating or migrating the corresponding file server from node A to node B. For example with reference back to FIG. 4, consider a scenario where the file server N 306 of node A has 6 file systems and where the path 301a from the host 302 to node A can be set to AO for the 6 file systems of file server N 306, and the path 301a from the host 302 to node B can be set to ANO for the 6 file systems of file server N 306. At a first point in time T21, the block I/O workload of 3 file systems of the file server N 306 of node A can be redirected from node A to node B by setting the path P2 for corresponding file system volumes over the interconnect to AO. At a second point in time T22 after T21, the block I/O workload of 3 additional file systems of the file server N of node A can be redirected from node A to node B by setting the path P2 for corresponding file system volumes over the interconnect to AO. Assuming the file server N 306 of node A has 6 file systems, at time T22, all 6 of the file system volumes of file server N 306 are now affined to node B such that the 6 file system volumes corresponding to the file systems of the file server N 306 of node A now have their block I/O workload, received at node A and then redirected to node B. As a result, the file server N 306 and its 6 file systems are located on, and run on, node A but their corresponding block level I/Os are serviced by node B. In at least one embodiment, processing can be performed to then also physically migrate or relocate the file server N 306 from node A to node B (e.g., where the file server N 306 runs on or is hosted on node B rather than node A) since it can be desired to keep the file server N 306 and its 6 file systems running local on the same node where the block level I/Os of the 6 file systems are serviced or processed (e.g., by node B's data path 332). In this manner, the techniques of the present disclosure can be used to gradually shift or redistribute the block level I/O workload of the file systems of the file server N 306 in small amounts at multiple points in time in connection with internode workload balancing. Subsequently, the file server N 306 can also be migrated from node A to node B where the path 301*b* from the host 302 to node B can be set to AO ad the path 301*a* from the host 302 to node A can be set to ANO.

In at least one embodiment in accordance with the techniques of the present disclosure, the concept of redirecting or redistributing block I/Os associated with corresponding file system I/Os from a first node to a second peer node, without moving or relocating between nodes the file server including the file system, can be extended for use in connection with balancing the I/O workload of the foregoing first and second nodes. For purposes of simplicity of illustration, the following paragraphs describe I/O workload balancing between the two nodes, such as node A and node B, based on the simplifying assumption that the node I/O workloads only include host I/Os that are file I/Os, which are mapped to corresponding block I/Os. In such an embodiment, the external hosts or storage clients only issue file I/Os to the storage system. More generally, the I/O workloads of the two nodes can include host I/O workload that includes file I/Os in combination with one or more other types of I/O workload such as host block I/Os such that the external hosts or storage clients can issue both file I/Os and block I/Os. In such an embodiment in this latter scenario where host I/Os can include both file I/Os and block I/Os, the block I/Os sent from the hosts to the storage system can be directed to one or more volumes or LUNs exposed by the storage system to the hosts over paths between the hosts and the storage system. More generally, the techniques of the present disclosure can be used in connection with host I/O workloads that include file-based I/Os, alone or in combination with, one or more other types of I/O workloads directed to corresponding storage objects that are hosted by the storage system and exposed to the one or more hosts connected to the storage system.

In at least one embodiment, when considering node-level I/O workloads, such as the I/O workload of node A and the I/O workload of node B to determine whether there is a node-level I/O workload imbalance between the two nodes, such node-level I/O workloads can generally include file I/O workloads alone, or in combination with, additional corresponding I/O workload of one or more other types of storage objects, such as volumes or LUNs, that are exposed to the external hosts or storage clients.

In at least one embodiment, the I/O workload of a node can include both read I/O workload and write I/O workload, where the read I/O workload can be determined separately from the write I/O workload. Additionally in at least one embodiment, the I/O workloads such as the read I/O workload of a node and the write I/O workload of a node can be normalized. In at least one embodiment, the read I/O workload can be expressed in terms of an I/O rate such as I/Os per second or IOPS as normalized read IOPS; and the write I/O workload can be expressed in terms of an I/O rate such as I/Os per second or IOPS as normalized write IOPS. In at least one embodiment, such normalized I/O workloads can be normalized to account for any differences in terms of I/O sizes and associated costs. More generally, an I/O workload of a node or storage object, such as a file system volume can include both a write I/O workload contribution and a read I/O workload contribution where both such workload types (e.g., read and write I/O workload types) can be normalized in at least one embodiment in connection with the techniques of the present disclosure.

Generally in at least one embodiment of a storage system including nodes A and B, a node-level read I/O workload and a node-level write I/O workload can be determined for each of the nodes. Determining whether there is a workload imbalance between nodes A and B can include i) determining whether there is a write I/O workload imbalance between the nodes; and ii) determining whether there is a read I/O workload imbalance between the nodes. An internode read I/O workload imbalance can be determined if the difference or gap between the read I/O workload of node A and the read I/O workload of node B exceeds an allowable maximum difference or gap. Put another way, processing can determine whether the difference or gap between node level read I/O workloads of nodes A and B falls within a specified allowable gap or difference range. If so, then no internode read I/O workload imbalance is determined; otherwise an internode read I/O workload imbalance is determined.

Similarly in at least one embodiment, an internode write I/O workload imbalance can be determined if the difference or gap between the write I/O workload of node A and the write I/O workload of node B exceeds an allowable maximum difference or gap. Put another way, processing can determine whether the difference or gap between node level write I/O workloads of nodes A and B falls within a specified allowable gap or difference range. If so, then no internode write I/O workload imbalance is determined; otherwise an internode write I/O workload imbalance is determined.

Thus an I/O workload imbalance such as described in connection with FIGS. 5A and 5B can be a read I/O workload imbalance or a write I/O workload imbalance. In at least one embodiment, there can be a write I/O workload imbalance and/or a read I/O workload imbalance between the nodes A and B at a point in time. One or more node affinity changes for one or more file system volumes can be determined to generally reduce any detected read I/O workload imbalance and any detected write I/O workload imbalance.

As a simple example reference is made back to FIGS. 5A and 5B, where the detected internode I/O workload imbalance is a write I/O workload imbalance, where $W1$=normalized write IOPS of node A, where $W2$=normalized write IOPS of node B, and where $W1>W2$ such that the gap or difference between $W1$ and $W2$ (denoted as W−W2 or the absolute value of the difference between W1 and W2) exceeds a maximum allowable gap or difference. In response to the write I/O workload imbalance, processing can be performed by shifting write I/O workload from node A to node B. Assume, for example, that W1=20 write IOPS and W2=5 write IOPS, where the maximum allowable gap or difference is 5 write IOPS but in this example the write I/O workload gap is 15 (thus exceeding the allowed maximum gap of 5). In this case, processing can be performed to identify one or more file system volumes affined to node A that can be shifted or redistributed to node B to reduce the write I/O workload gap or difference. In this example, file system volume V1 420 can be selected and can have a normalized write I/O workload W3=8 write IOPS. Assume for simplicity that V1 420's I/O workload is 100% writes and 0% reads. V1 420 can be affined to node B to redirect the block I/O workload, including V1's read and write I/O workload, from node A to node B. As a result of the foregoing redirection of V1's workload from node A to node B through the interconnect 320 over AO path P2, the expected resulting write I/O workload of node A, denoted W1 revised, is 20−8=12 write IOPS; and the expected resulting write I/O workload of node B, denoted W2 revised, is 5+8=13 write IOPs. In this example, the foregoing block I/O workload of V1 redirected over the interconnect on the AO path P2 to node B reduces and alleviates the write I/O workload imbalance between the nodes without impacting the current read I/O workloads of the nodes since V1 420 has no read I/O workload. In a similar manner, if there is a read I/O workload imbalance between the nodes, read I/O workload can be shifted or redistributed from the node with the higher read workload to the peer node with the lower read workload. For simplicity, the foregoing assumed that the file system volume block I/O workload shifted included only write I/Os but generally the shifted I/O workload can include both read I/O workload and write I/O workload. Accordingly, modeling the projected or expected node read and write I/O workloads after the workload shift or distribution needs to also account for both read and write I/O workloads shifted between the nodes.

In at least one embodiment, it can be desired where possible to select one or more file system volumes to reduce any detected I/O workload imbalance of one type without increasing or worsening an I/O workload imbalance of another type. However depending on the particular file system volume I/O workloads at various points in time, shifting the file system volume workload such as V1 from node A to node B to correct a write I/O workload imbalance may also worsen or create a read I/O workload imbalance. For example, assume that V1 420 has an I/O workload that also includes a read I/O workload that, when redirected to node B now causes a read I/O workload imbalance between node A's read I/O workload R1, and node B's read I/O workload, R2, such that R2>R1. Assume that modeling or projecting determines that, after shifting V1's workload to node B, the expected read I/O workload of node A, R1 is 10 read IOPS; and the expected read IO workload of node B, R2, is 30 read IOPS, which exceeds a maximum allowable gap or difference of 10 read IOPS (here the gap or difference is 20 read IOPS). In response, a second file system volume, not illustrated, can also be selected to now reduce or remove the created read I/O workload imbalance.

In this manner, an embodiment can consider the net effect of shifting file system volume workloads between the nodes where such workloads can include both read and write I/Os when seeking to reduce or eliminate a detected internode read I/O workload imbalance and/or a detected write I/O workload imbalance. In at least one embodiment, file system volume candidates can be selected with a net effect goal to eliminate or reduce a type of detected internode workload imbalance while also not creating any other type of workload imbalance and/or not worsening an existing other type of workload imbalance. For example in at least one embodiment, the file system volumes selected when there is a read I/O workload imbalance can reduce the read I/O workload imbalance without creating a write I/O workload imbalance or without worsening an existing write I/O workload imbalance. In a similar manner in at least one embodiment, the file system volumes selected when there is a write I/O workload imbalance can reduce the write I/O workload imbalance without creating a read I/O workload imbalance or without worsening an existing read I/O workload imbalance.

In at least one embodiment, it should be noted that I/O latency as experienced by the external storage client, such as a host or application executing on the host, can be improved or reduced as a results of internode I/O workload balancing. Generally, I/O latency increases as the I/O workload increases, where the I/O workload can be measured using IOPS and/or one or more other suitable metrics. Thus I/O latency increases generally as the I/O workload increases. If there is an internode I/O workload imbalance among multiple processing nodes of the storage system, the particular storage clients having I/Os serviced by the node with the larger I/O workload can generally experience a higher I/O latency than I/O serviced by the peer node with the remaining lower I/O workload. Due to the foregoing internode I/O workload imbalance, overall system performance such as related to overall I/O latency experienced by storage clients can be adversely affected by the internode I/O workload imbalance. Using the techniques of the present disclosure in at least one embodiment to reduce or eliminate any internode I/O workload imbalance can thus reduce the I/O workload and associated I/O latency such as in connection with the overloaded node, or more generally, the node of the storage system having the larger I/O workload. In at least one embodiment, one goal of the internode I/O load balancing is to help lower the I/O latency of file systems by moving some block I/O load from an overloaded node to a peer node. I/O latency as experienced by the storage clients can be measured using any suitable metric such as, for example, I/O response time.

In at least one embodiment, balancing internode I/O workload between the nodes A and B can be generally outlined as follows.

In a first step S1, determine normalized read IOPS for node A, normalized write IOPS for node A, normalized read IOPS for node B, and normalized write IOPS for node B. Following the step S1, a step S2 can be performed.

In the step S2, calculate the normalized read IOPS imbalance between the nodes, if any, and the normalized write IOPS imbalance between the nodes, if any. Following the step S2 is a step S3.

In the step S3, determine the normalized I/O workloads for the candidate file system volumes eligible for a node affinity change and their respective current node affinity. The normalized I/O workload for each candidate volume can include: i) a normalized read IOPS (denoting the candidate volume's read I/O workload); and ii) a normalized write IOPS (denoting the candidate volume's write I/O workload). From the step S3 control proceeds to the step S4.

In the step S4, processing can be performed to select one or more candidate file system volumes to have their node affinity modified such that each node has approximately the same read I/O workload, within a specified read workload threshold difference or tolerance; and such that each node has approximately the same write I/O workload, within a specified write threshold difference or tolerance. The step S4 can include selecting candidate file system volumes that, collectively, reduce or eliminate a first type (e.g., read or write) of I/O workload imbalance without introducing or increasing another type of I/O workload imbalance. From the step S4, control proceeds to the step S5.

In the step S5, the node affinity changes for selected candidate file system volumes can be implemented by modifying corresponding paths states such that the node affined to a file system volume corresponds to the particular AO path for the volume. For example, if a file system volume is affined to node B, the particular path designated as AO can be the path through or to node B with the remaining path to the file system volume through node A designated as ANO. If a file system volume is affined to node A, the particular path designated as AO can be the path through or to node A with the remaining path to the file system volume through node B designated as ANO.

What will now be described is one way in which normalized I/O workloads can generally be determined in at least one embodiment. In at least one embodiment, such normalized I/O workloads can be determined in accordance with the techniques of the present disclosure with respect to node level I/O workloads and candidate file system volume I/O workloads.

In at least one embodiment, IOPS normalization constants or coefficients, A and B, can be specified. The particular values for A and B can vary with, and can be determined, based at least in part, on a specified storage system type or model denoting the storage system's hardware configuration and/or type. The IOPS normalization constants can include a first constant or coefficient A used in normalizing read IOPS; and a second constant or coefficient B used in normalizing write IOPS. In at least one embodiment, values for A and B can vary with the particular type, platform or model ID (identifier) denoting the hardware configuration and hardware resources of the storage system or appliance under consideration. To further illustrate, there can be 3 different defined hardware configurations for 3 storage systems specified respectively as EX1, EX2 and EX3. A first pair of constants or coefficients (A1, B1) can be specified as the IOPS normalization constants for EX1; a second pair of constants or coefficients (A2, B2) can be specified as the IOPS normalization constants for EX2; and a third pair of constants or coefficients (A3, B3) can be specified as the IOPS normalization constants for EX3. A particular one of the foregoing 3 pairs can be selected for use in accordance with the particular type or model under consideration. The type, platform or model of the storage system (e.g., EX1, EX2 or EX3) can identify a particular hardware configuration and amount of various hardware resources (e.g., number of processors or CPUs, number of processor cores, an amount of cache, amount of memory, and the like) configured in a particular type of storage appliance or system. For example, the type or model can be one of multiple predefined types or models each associated with a different corresponding hardware configuration of a particular appliance or system provided by a particular vendor or manufacturer.

In at least one embodiment, the particular pair of IOPS normalization constants, A, B, can be based, at least in part, on the specified type or model of input 1 above denoting the hardware configuration and/or type. Additionally, the particular pair of IOPS normalization constants, A, B, can be based, at least in part, on the specified type or model in combination with a particular normalized or standardized I/O size.

In some embodiments, a pair of constants or coefficients (A, B) can be selected based, at least in part, on 1) the hardware type or model of the system, site or appliance under consideration; 2) the particular standardized or normalized I/O size; and also 3) the I/O workload of the system, site or appliance under consideration. In at least one embodiment, the cost incurred for I/Os of the same type but of different sizes may not scale linearly such that, for example, there may be some fixed overhead incurred for any size read I/O. For a larger size read I/Os, the same fixed overhead can be incurred along with a variable cost or amount of resources in accordance with the read I/O size.

In at least one embodiment, values for the coefficients A and B may be established, for example, by running I/O load tests with various I/O sizes and observing when the system reaches its maximum I/O throughput or IOPS rate for each of the various sizes.

Generally, a current I/O workload "iops1" with I/Os of size "iosize1" can be further normalized or standardized to IOPS of size "iosizenorm" on the same system as expressed in EQUATION 1 below (e.g., (e.g., put another way, (iops1, iosize1) may denote a point to be normalized):

$$\text{iopsnorm} = \text{iops1}(\text{iosize1}/\text{iosizenorm})\text{CONST} \quad \text{EQUATION 1}$$

where:
  iopsnorm as expressed using EQUATION 1 denotes an equivalent normalized IOPS value for iops1;
  iops1 denotes an I/O rate per second of I/Os each of size "iosize1";
  iosizenorm denotes the base size or standard size used for normalization to scale the point (iops1, iosize1) to a normalized corresponding point (iopsnorm, iosizenorm), where iopsnorm may be determined using EQUATION 1; and
  CONST denotes the constant or coefficient used an exponent in EQUATION 1, where CONST can be the constant A (described above) if iops1 and iosize1 correspond to read IOPS and read I/O size, and where CONST can be the constant B (described above) if iops and iosize1 correspond to write IOPS and write I/O size.

To further illustrate, assume the iosizenorm=4K bytes. In this case, EQUATION 1 may be used to normalize any IOPS value, iops1, for I/Os of iosize1 to an equivalent normalized IOPS value, iopsnorm. Using EQUATION 1 with the same base size or standard size, iosizenorm, for multiple input IOPS values of different I/O sizes provides for scaling or normalizing the input IOPS values using the same base or standard size where such normalized IOPS values can then be used as normalized units for comparison purposes and with the techniques of the present disclosure for internode load balancing.

In at least one embodiment, processing can be performed to detect an I/O workload imbalance or "gap" between the nodes, and take action to correct or alleviate imbalance. In at least one embodiment, determining whether there is an I/O workload imbalance may be performed using normalized I/O workloads for read I/Os and write I/Os separately. In this manner, a first gap or difference with respect to read I/O workload of the 2 nodes may be evaluated to determine whether there is a read I/O workload imbalance. Additionally, a second gap or difference with respect to write I/O workload of the 2 nodes may be evaluated to determine whether there is a write I/O workload imbalance.

For each type (e.g., each of the read I/O type and write I/O type) of I/O workload, a percentage or equivalent decimal value may be determined for each node denoting the relative percentage of the I/O workload on that node. For example, for read I/O workload, based on the total aggregate read I/O workload of the two nodes, where 100% denotes the total aggregate read I/O workload, a percentage between 0 and 100% inclusively is assigned to each node based on the portion of the read I/O workload on that node. The gap may denote the difference between the two percentages assigned to the two nodes for a particular type of I/O workload. For example, assume that node A has 30% or 0.30 of the total aggregate read I/O workload and node B has 70% or 0.70 of the total aggregate read I/O workload. In this case, the gap for the read I/O workload is 0.4 or 40%.

The ideal balance can be to have a gap=0 for each of the read I/O workload and the write I/O workload. However, for practical reasons, an embodiment may define a required balance for 2 nodes as a range [q, 1−q], denoting that for each node its read I/O workload and write I/O workload should be in the target range [q, 1−q] of the total (so the gap is $\leq |1-2q|$). In the foregoing target range, q denotes a decimal value between 0 and 1, inclusively. In at least one embodiment a default value for q may be specified. For example, in at least one embodiment the default q may be 0.3, thereby having a corresponding target range of [0.3-0.7] for the I/O workload of each node. An embodiment may use the same or different q values for the read I/O workload and the write I/O workload. Thus in at least one embodiment, a read I/O workload imbalance between the two nodes A and B can be determined if the gap for the read I/O workload does not fall into a corresponding target range for the read I/O workload. In at least one embodiment, a write I/O workload imbalance between the two nodes A and B can be determined if the gap for the write I/O workload does not fall into a corresponding target range for the write I/O workload.

What will now be described are flowcharts of FIGS. 6A, 6B, 7A and 7B that summarize processing described above that can be performed in at least one embodiment in accordance with the techniques of the present disclosure.

Figure 6A:
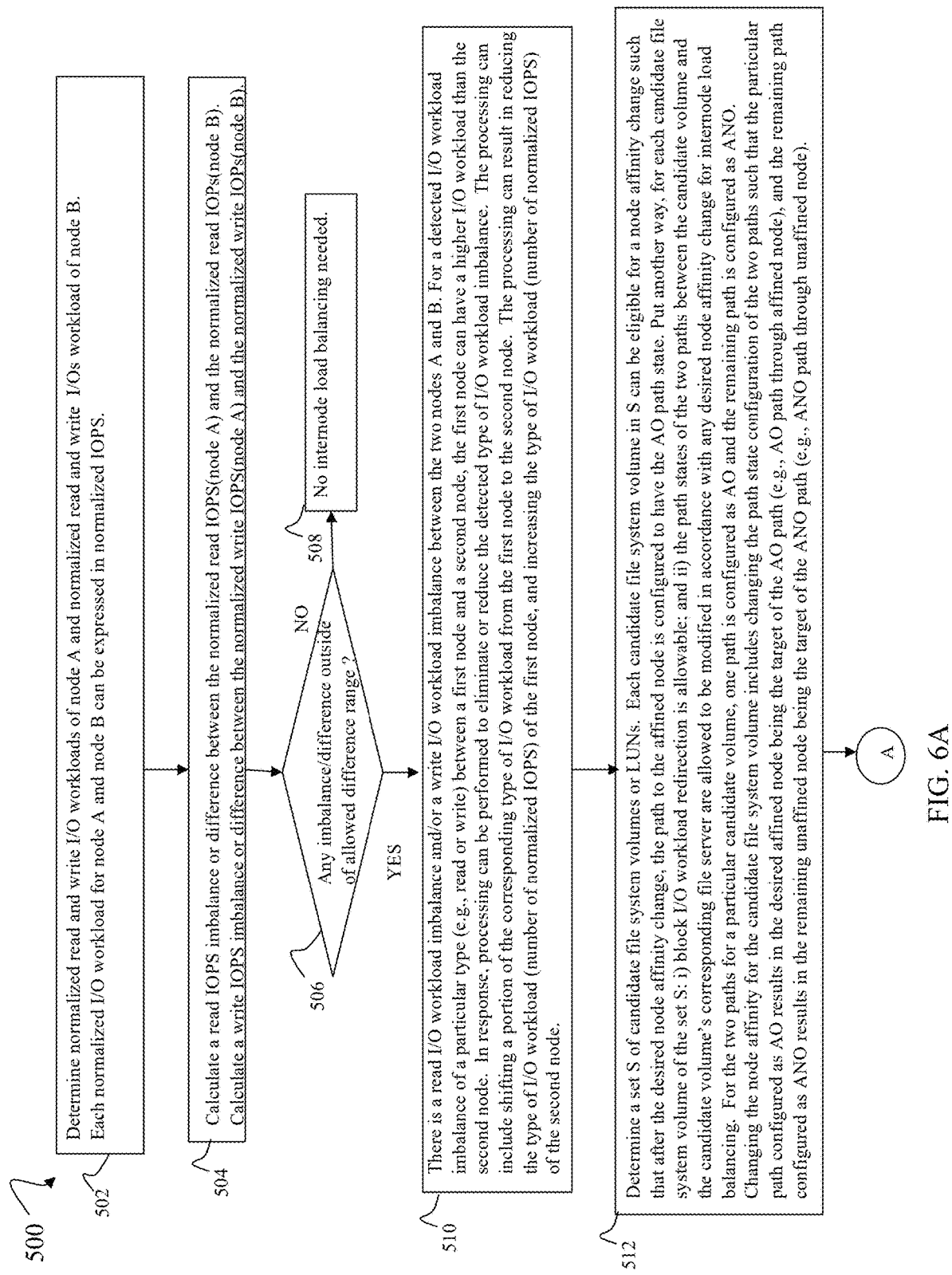

Referring to FIGS. 6A and 6B, shown is a first flowchart 500, 501 of processing steps that can be performed in at least one embodiment in accordance with the techniques of the present disclosure.

At the step 502, processing is performed to determine the normalized read and write I/O workloads of node A and the normalized read and write I/Os workload of node B. Each normalized I/O workload for node A and node B can be expressed in normalized IOPS. From the step 502, control proceeds to the step 504.

At the step 504, processing can be performed to calculate a read IOPS imbalance or difference between the normalized read IOPS of node A and the normalized read IOPs of node B; and calculate a write IOPS imbalance or difference between the normalized write IOPS of node A and the normalized write IOPs of node B. From the step 504, control proceeds to the step 506.

At the step 506, a determination can be made as to whether any type of workload imbalance between the nodes is outside of a specified allowable range. For example, a first allowable range can be specified for read I/O workload such that if the read IOPS imbalance or difference is within the first allowable range, then the step 506 determines here is no read IOPS imbalance between the nodes, and otherwise that there is a read IOPS imbalance between the nodes. A second allowable range can be specified for write I/O workload such that if the write IOPS imbalance or difference is within the second allowable range, then the step 506 determines here is no write IOPS imbalance between the nodes, and otherwise that there is a write IOPS imbalance between the nodes. In at least one embodiment, the step 506 can evaluate to yes if at least one of the write IOPS imbalance or difference is out of the first allowable range and/or the read IOPS imbalance or difference is out of the second allowable range; otherwise the step 506 evaluates to no.

If the step 506 evaluates to no, where both the read IOPS imbalance or difference and the write IOPS imbalance or difference are within their corresponding allowable range, then control proceeds to the step 508. At the step 508, it can be determined that there is no I/O workload imbalance between the nodes, outside of the allowance tolerances or allowed ranges so no workload redistribution between the nodes is needed.

If the step 506 evaluates to yes, where one or both of the types of IOPS workload imbalances are outside of their respective tolerances or allowable ranges, then control proceeds from the step 506 to the step 510.

At the step 510, there is a read I/O workload imbalance and/or a write I/O workload imbalance between the two nodes A and B. For a detected I/O workload imbalance of a particular type (e.g., read or write) between a first node and a second node, the first node can have a higher I/O workload than the second node. In response, processing can be performed to eliminate or reduce the detected type of I/O workload imbalance. The processing can include shifting a portion of the corresponding type of I/O workload from the first node to the second node. The processing can result in reducing the type of I/O workload (number of normalized IOPS) of the first node, and increasing the type of I/O workload (number of normalized IOPS) of the second node. From the step 510, control proceeds the step 512.

At the step 512, processing can determine a set S of candidate file system volumes or LUNs. Each candidate file system volume in S can be eligible for a node affinity change such that after the desired node affinity change, the path to the affined node is configured to have the AO path state. Put another way, for each candidate file system volume of the set S: i) block I/O workload redirection is allowable; and ii) the path states of the two paths between the candidate volume and the candidate volume's corresponding file server are allowed to be modified in accordance with any desired node affinity change for internode load balancing. For the two paths for a particular candidate volume, one path is configured as AO and the remaining path is configured as ANO. Changing the node affinity for the candidate file system volume includes changing the path state configuration of the two paths such that the particular path configured as AO results in the desired affined node being the target of the AO path (e.g., AO path through affined node), and the remaining path configured as ANO results in the remaining unaffined node being the target of the ANO path (e.g., ANO path through unaffined node). From the step 512, control proceeds the step 514.

At the step 514, processing can determine normalized I/O workloads (e.g., read and write workloads) for candidate file system volumes or LUNs of S that are eligible for node affinity changes. For each candidate volume or LUN in the set S, also identify the candidate's current node affinity (e.g., which path is currently designated as AO). From the step 514, control proceeds the step 516.

At the step 516, processing can determine an affinity configuration or node affinity configuration for the candidate file system volumes or LUNs of S such that each of the two nodes has approximately the same number of normalized read IOPs, such as within a specified read workload difference range; and such that each of the two nodes has approximately the same number of normalized write IOPS, such as within a specified write workload difference range. The affinity configuration can model node affinity configurations for the candidate volumes of S. The affinity configuration can indicate, for each candidate volume of the set S, which node is affined to the candidate volume in the modeled node affinity configuration. From the step 516, control proceeds to the step 518.

At the step 518, in accordance with the affinity configuration determined in the step 516, change the current node affinity for one or more selected candidate file system volumes or LUNs of S. A node affinity change for a selected candidate volume of S can include: i) configuring the path to the affined node to have a corresponding path state of AO; and ii) configuring the remaining path to the unaffined node to have a corresponding path state of ANO. The node affinity changes for the one or more selected candidates can be included in an action performed to remove or at least reduce a detected internode I/O workload imbalance between the two nodes. The action can include changing the affined node of each selected candidate volume from the first node to the second node by configuring the path to the first node as AO and configuring the remaining path to the second node as ANO. From the step 518, control proceeds the step 520.

At the step 520, the one or more impacted file servers can be notified regarding the path state changes made in the step 518 based on the node affinity changes of the one or more selected candidate volumes of S. In particular, each selected candidate volume of S that had their respective node affinity changed can be associated with a respective file system included in a file server. The file server can be characterized as an impacted file server that is notified regarding the path state changes with respect to the two paths to the selected candidate volume.

The processing of FIGS. 6A and 6B can be performed or repeated periodically at various points in time although only a single iteration is described above.

Figure 7A:
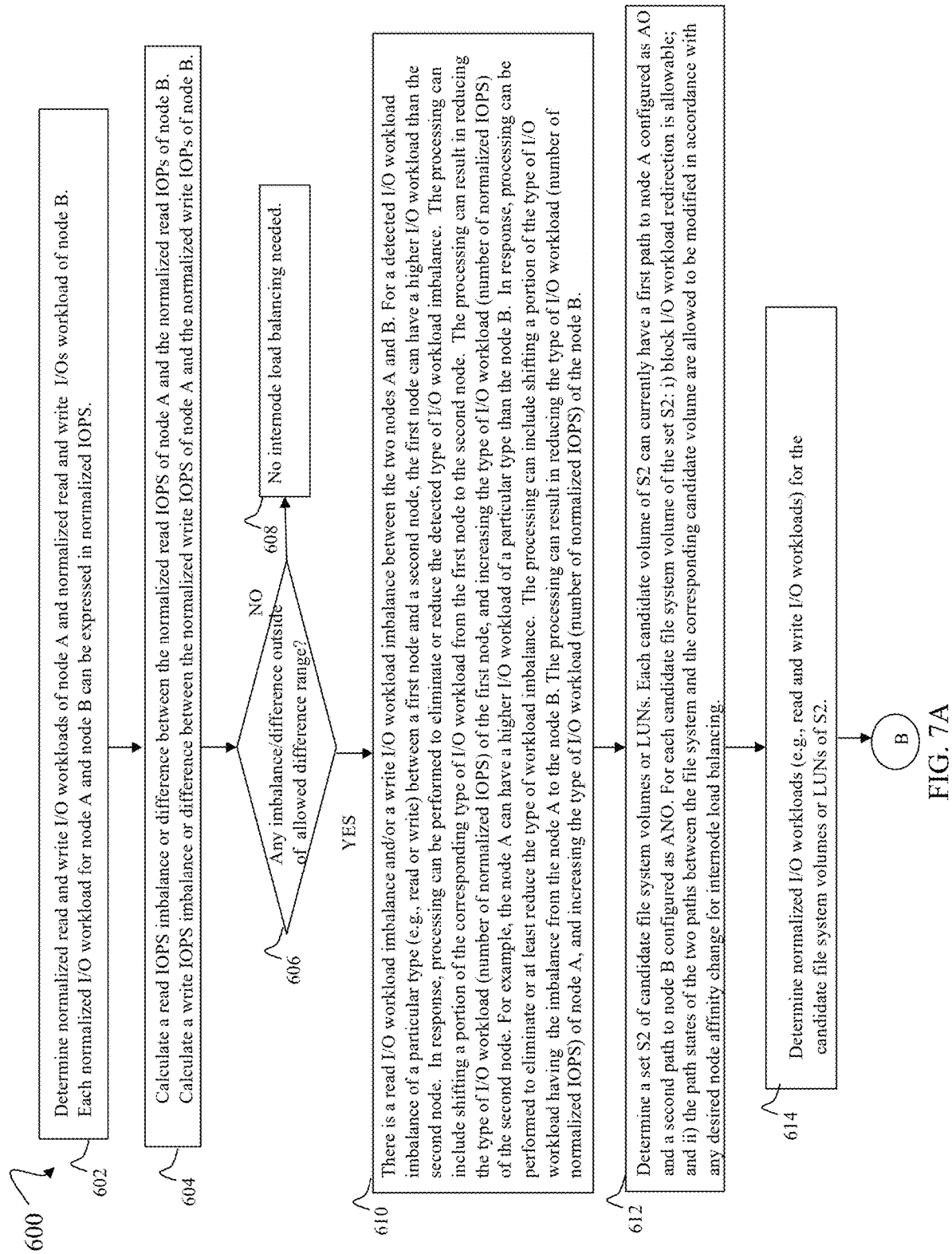
Figure 7B:
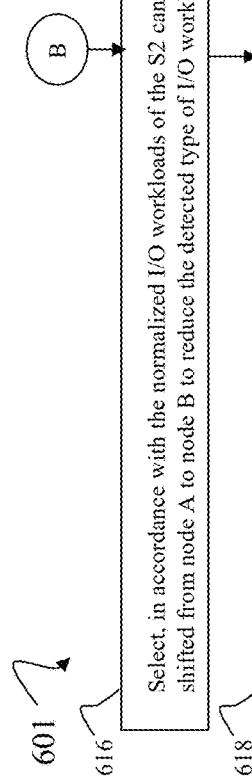

Referring to FIGS. 7A and 7B, shown is a second flowchart 600, 601 of processing steps that can be performed in at least one embodiment in accordance with the techniques of the present disclosure.

At the step 602, processing can determine normalized read and write I/O workloads of node A and normalized read and write I/Os workload of node B. Each normalized I/O workload for node A and node B can be expressed in normalized IOPS. From the step 602, control proceeds to the step 604.

At the step 604, processing can calculate a read IOPS imbalance or difference between the normalized read IOPS of node A and the normalized read IOPs of node B; and calculate a write IOPS imbalance or difference between the normalized write IOPS node A and the normalized write IOPs node B. From the step 604, control proceeds to the step 606.

At the step 606, a determination can be made as to whether any type of workload imbalance between the nodes is outside of a specified allowable range. For example, a first allowable range can be specified for read I/O workload such that if the read IOPS imbalance or difference is within the first allowable range, then the step 606 determines here is no read IOPS imbalance between the nodes, and otherwise that there is a read IOPS imbalance between the nodes. A second allowable range can be specified for write I/O workload such that if the write IOPS imbalance or difference is within the second allowable range, then the step 606 determines here is no write IOPS imbalance between the nodes, and otherwise that there is a write IOPS imbalance between the nodes. In at least one embodiment, the step 606 can evaluate to yes if at least one of the write IOPS imbalance or difference is out of the first allowable range and/or the read IOPS imbalance or difference is out of the second allowable range; otherwise the step 606 evaluates to no.

If the step 606 evaluates to no, where both the read IOPS imbalance or difference and the write IOPS imbalance or difference are within their corresponding allowable range, then control proceeds to the step 608. At the step 608, it can be determined that there is no I/O workload imbalance between the nodes, outside of the allowance tolerances or allowed ranges so no workload redistribution between the nodes is needed.

If the step 606 evaluates to yes, where one or both of the types of IOPS workload imbalances are outside of their respective tolerances or allowable ranges, then control proceeds from the step 606 to the step 610.

At the step 610, there is a read I/O workload imbalance and/or a write I/O workload imbalance between the two nodes A and B. For a detected I/O workload imbalance of a particular type (e.g., read or write) between a first node and a second node, the first node can have a higher I/O workload than the second node. In response, processing can be performed to eliminate or reduce the detected type of I/O workload imbalance. The processing can include shifting a portion of the corresponding type of I/O workload from the first node to the second node. The processing can result in reducing the type of I/O workload (number of normalized IOPS) of the first node, and increasing the type of I/O workload (number of normalized IOPS) of the second node. For example, the node A can have a higher I/O workload of a particular type than the node B. In response, processing can be performed to eliminate or at least reduce the type of workload imbalance. The processing can include shifting a portion of the type of I/O workload having the imbalance from the node A to the node B. The processing can result in reducing the type of I/O workload (number of normalized IOPS) of node A, and increasing the type of I/O workload (number of normalized IOPS) of the node B. From the step 610, control proceeds to the step 612.

At the step 612, processing can determine a set S2 of candidate file system volumes or LUNs. Each candidate volume of S2 can currently have a first path to node A configured as AO and a second path to node B configured as ANO. For each candidate file system volume of the set S2: i) block I/O workload redirection is allowable; and ii) the path states of the two paths between the file system and the corresponding candidate volume are allowed to be modified in accordance with any desired node affinity change for internode load balancing. From the step 612, control proceeds to the step 614.

At the step 614, processing can determine normalized I/O workloads (e.g., read and write I/O workloads) for the candidate file system volumes or LUNs of S2. From the step 614, control proceeds to the step 616.

At the step 616, processing can be performed to select, in accordance with the normalized I/O workloads of the S2 candidates, one or more candidate volumes from S2 to have their block I/O workload shifted from node A to node B to reduce the detected type of I/O workload imbalance such as reduce a detected read or write I/O workload imbalance. From the step 616, control proceeds to the step 618.

At the step 618, processing can be performed to implement the block I/O workload shift for the one or more selected candidate volumes of S2 and notify the impacted one or more file servers of corresponding path state changes with respect to paths between corresponding impacted file servers and the one or more selected candidate volumes of S2. For each selected candidate of S2, implementing the block I/O workload shift can include: i) changing the path state of the first path to node A from AO to ANO; and ii) changing the path state of the second path to node B from ANO to AO.

A first candidate volume V11 of S2 can be included in a file system FS11 of a file server FSVR11 of node A. For V11, the first path P11A from FS11 (and thus from FSRV11) on node A to V11 can be local to node A; and the second path P11B from FS11 (and thus FSRV11) on node A to V11 can be a path through the interconnect to the peer node B. Before implementing the block I/O workload shift for V11, V11 can be affined to node A where the path P11A=AO and the path P11B=ANO. After implementing the block I/O workload shift for V11, V11 can be affined to node B where the path P11A=ANO and the path P11B=AO. After implementing the block I/O workload shift for V11 in the step 618, block I/Os from FS11 of FSVR11 are sent on the AO path P11B over the interconnect and thus redirected to the peer node B for servicing by node B's data path.

A second candidate volume V12 of S2 can be included in a file system FS12 of a file server FSVR12 of node B. For V12, the first path P12A from FS12 (and thus from FSRV12) of node B to V12 can be a path through the interconnect to the peer node A; and the second path P12B from FS12 (and thus FSRV12) on node B can be local to node B. Before implementing the block I/O workload shift for V12, V12 can be affined to node A where the path P12A=AO and the path P12B=ANO. After implementing the block I/O workload shift for V12, V12 can be affined to node B where the path P12A=ANO and the path P12B=AO. After implementing the block I/O workload shift for V12 in the step 618, block I/Os from FS12 of FSVR12 are sent on the AO path P12B which is local to the node B such that the block I/Os sent on AO path P12B can be serviced by node B's data path. In this latter case regarding the second candidate volume V12, the second candidate V12 can be an example of a prioritized candidate selection to reverse a prior block I/O redirection and restore the node affinity of file system volume V12 to be on the same node B as the corresponding file system FS12 and file server FSRV12. Put another way, the node affinity of V12 can be modified to node B to match or correspond to the node B that includes the corresponding file system FS12 and file server FSRV12. In this manner, V12 can be accessed by the file server FSRV12 locally on node B through an AO path on node B, where node B locally services block I/Os directed to V12. The foregoing can be performed in at least one embodiment to reduce any adverse impact on the cumulative bandwidth of the interconnect that is consumed by the file server block I/O traffic redirected over the interconnect. From the step 618, control proceeds to the step 620.

At the step 620, first file I/Os directed to the file system FS11 can be received from a host at node A. The first file I/Os are mapped, by the file system FS11, to corresponding first block I/Os that are sent by the file system FS11, and thus by the file server FSRV11, over the AO path P11B. The first block I/Os sent on AO path P11B are redirected over the interconnect to the peer node B for servicing by node B's data path.

At the step 620, second file I/Os directed to the file system FS12 can be received from a host at node B. The second file I/Os are mapped, by the file system FS12, to corresponding second block I/Os that are sent by the file system FS12, and thus by the file server FSVR12, over the AO path P12B that is local to node B, where the second block I/Os are serviced locally by node B's data path.

The processing of FIGS. 7A and 7B can be performed or repeated periodically at various points in time although only a single iteration is described above.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer-implemented method comprising:
 configuring a first file server on a first node of a storage system, the first file server including a first file system configured on a first volume, where the storage system includes a second node;
 configuring multiple paths, including a first path and a second path, over which the first volume is exposed to the first file server, where said configuring multiple paths includes:
  configuring the first path over which the first file system of the first node issues I/Os directed to the first volume, wherein the first path is local on the first node and a first data path component of the first node services I/Os of the first volume sent over the first path;
  configuring the second path over which the first file system of the first node issues I/Os directed to the first volume, wherein the second path includes an interconnect between the first node and the second node so that I/Os, that are directed to the first volume and that are issued over the second path, are transmitted from the first file system to the second node where a second data path component of the second node services I/Os of the first volume sent over the second path through the interconnect from the first node to the second node;
 configuring a multipath layer of the first node to transmit I/Os directed to the first volume over one of the first path and the second path currently configured with a path state of active-optimized (AO); and
 at a first point in time, configuring the first path with respect to the first volume with a path state of AO and configuring the second path with respect to the first volume with a path state of active-non-optimized (ANO);
 subsequent to the first point in time while the first path with respect to the first volume is configured with a path state of AO and while the second path with respect to the first volume is configured with a path state of ANO, determining an internode I/O workload imbalance between the first node and the second node; and
 responsive to determining the internode I/O workload imbalance between the first node and the second node, performing first processing to reduce or remove the internode I/O workload imbalance between the first node and the second node including:
  at a second point in time subsequent to the first point in time, redirecting I/O workload of the first volume from the first node to the second node over the second path through the interconnect by modifying a path state of the first path from AO to ANO and by modifying a path state of the second path through the interconnect from ANO to AO.

2. The computer-implemented method of claim 1, wherein the internode I/O workload imbalance is a read I/O workload imbalance that does not fall within an allowable read I/O workload difference range.

3. The computer-implemented method of claim 2, wherein a first read I/O workload of the first node exceeds a second read I/O workload of the second node by more than a threshold amount.

4. The computer-implemented method of claim 3, wherein the first read I/O workload of the first node denotes a first normalized read I/O workload of the first node based, at least in part, on a normalized or standard I/O size and a current hardware configuration of the storage system, and wherein the second read I/O workload of the second node denotes a second normalized read I/O workload of the second node based, at least in part, on the normalized or standard I/O size and the current hardware configuration of the storage system.

5. The computer-implemented method of claim 1, wherein the internode I/O workload imbalance is a write I/O workload imbalance that does not fall within an allowable write I/O workload difference range.

6. The computer-implemented method of claim 5, wherein a first write I/O workload of the first node exceeds a second write I/O workload of the second node by more than a threshold amount.

7. The computer-implemented method of claim 6, wherein the first write I/O workload of the first node denotes a first normalized read I/O workload of the first node based, at least on part, on a normalized or standard I/O size and a current hardware configuration of the storage system, and wherein the second write I/O workload of the second node denotes a second normalized write I/O workload of the second node based, at least in part, on the normalized or standard I/O size and the current hardware configuration of the storage system.

8. The computer-implemented method of claim 1, wherein the first processing includes:
  selecting the first volume from a candidate set of a plurality of volumes, wherein each volume in the candidate set is a dedicated file system volume configured for use by a corresponding file system of the storage system, wherein each of the volumes of the candidate set is configured from backend non-volatile storage of the storage system.

9. The computer-implemented method of claim 8, wherein a second volume that is configured for use by a second file system of the storage system is excluded from the candidate set because the second file system is I/O latency sensitive.

10. The computer-implemented method of claim 9, wherein the second file system is included in a transactional file server wherein multiple file system operations directed to the second file system are performed as a single transaction.

11. The computer-implemented method of claim 9, wherein a defined set of quality of service QOS) settings include a low QOS setting, a medium QOS setting and a high QOS setting, and wherein the QOS settings ranked in order from highest target performance to lowest target performance is the high QOS setting, the medium QOS setting, and the low QOS setting, and wherein each volume of the candidate set has an associated QOS (quality of service) setting that is one of the low QOS setting or the medium QOS setting.

12. The computer-implemented method of claim 11, wherein the second volume has an associated QOS setting that is the high QOS setting.

13. The computer-implemented method of claim 1, wherein the first processing includes:
  prior to said redirecting I/O workload of the first volume, performing second processing comprising:
    determining whether a total amount of interconnect bandwidth of the interconnect consumed, in connection with redirecting I/O workload of file system volumes between the nodes over the interconnect, would exceed a maximum bandwidth threshold if I/O workload of the first volume is redirected over the second path through the interconnect from the first node to the second node; and
    responsive to determining the maximum bandwidth threshold would not be exceeded if I/O workload of the first volume is redirected over the second path through the interconnect from the first node to the second node, performing said redirecting I/O workload of the first volume from the first node to the second node over the second path through the interconnect by modifying a path state of the first path from AO to ANO and by modifying a path state of the second path from ANO to AO.

14. The computer-implemented method of claim 13, wherein the second processing includes:
  responsive to determining the maximum bandwidth threshold would be exceeded if I/O workload of the first volume is redirected over the second path through the interconnect from the first node to the second node, determining not to perform said redirecting IO workload of the first volume from the first node to the second node over the second path through the interconnect by modifying a path state of the first path from AO to ANO and by modifying a path state of the second path from ANO to AO.

15. The computer-implemented method of claim 1, further comprising:
  receiving, at the first node from a host, a first file I/O directed to the first file system, wherein the first file system maps the first file I/O to a corresponding first block I/O directed to the first volume;
  subsequent to the first point in time and prior to the second point in time, the multipath layer of the first node sending the first block I/O directed to the first volume over a selected one path of the first path and the second path having a corresponding path state of AO, where said selected one path is the first path currently having a corresponding path state of AO and where the second path has a corresponding path state of ANO and is therefore not selected by the multipath layer to transmit the first block IO to the first volume.

16. The computer-implemented method of claim 15, further comprising:
  receiving, at the first node from the host, a second file I/O directed to the first file system, wherein the first file system maps the second file IO to a corresponding second block I/O directed to the first volume; and subsequent to the second point in time when the first path has a corresponding path state of ANO and the second path has a corresponding path state of AO, the multipath layer of the first node sending the second block IO directed to the first volume over a selected one path of the first path and the second path having a corresponding path state of AO, where said selected one path is the second path currently having a corresponding path state of AO and where the first path has a corresponding path state of ANO and is therefore not selected by the multipath layer to transmit the first block I/O to the first volume.

17. The computer-implemented method of claim 1, subsequent to the second point in time while the first path with respect to the first volume is configured with a path state of ANO and while the second path with respect to the first volume is configured with a path state of AO, determining a second internode I/O workload imbalance between the first node and the second node; and responsive to determining the second internode I/O workload imbalance between the first node and the second node, performing second processing to reduce or remove the second internode I/O workload imbalance between the first node and the second node including:
at a third point in time subsequent to the second point in time, restoring node affinity of the first volume to the first node rather than the second node, wherein said restoring node affinity includes redistributing I/O workload of the first volume from the second node to the first node so that I/Os directed to the first volume are sent over the first path rather than over the second path through the interconnect, wherein said restoring node affinity includes modifying a path state of the first path from ANO to AO and by modifying a path state of the second path from AO to ANO.

18. The computer-implemented method of claim 1, wherein the multipath layer is configured to transmit I/Os directed to the first volume over any of the first path and the second path configured with a path state of ANO only if there is no available one of the first path and the second path that is i) configured with an AO path state and ii) capable of transmitting I/Os directed to the first volume.

19. A system comprising:
one or more processors; and
one or more memories comprising code stored thereon that, when executed, perform a method comprising:
configuring a first file server on a first node of a storage system, the first file server including a first file system configured on a first volume, where the storage system includes a second node;
configuring multiple paths, including a first path and a second path, over which the first volume is exposed to the first file server, where said configuring multiple paths includes:
configuring the first path over which the first file system of the first node issues I/Os directed to the first volume, wherein the first path is local on the first node and a first data path component of the first node services I/Os of the first volume sent over the first path;
configuring the second path over which the first file system of the first node issues I/Os directed to the first volume, wherein the second path includes an interconnect between the first node and the second node so that I/Os, that are directed to the first volume and that are issued over the second path, are transmitted from the first file system to the second node where a second data path component of the second node services I/Os of the first volume sent over the second path through the interconnect from the first node to the second node;
configuring a multipath layer of the first node to transmit I/Os directed to the first volume over one of the first path and the second path currently configured with a path state of active-optimized (AO); and
at a first point in time, configuring the first path with respect to the first volume with a path state of AO and configuring the second path with respect to the first volume with a path state of active-non-optimized (ANO);
subsequent to the first point in time while the first path with respect to the first volume is configured with a path state of AO and while the second path with respect to the first volume is configured with a path state of ANO, determining an internode I/O workload imbalance between the first node and the second node; and
responsive to determining the internode I/O workload imbalance between the first node and the second node, performing first processing to reduce or remove the internode I/O workload imbalance between the first node and the second node including:
at a second point in time subsequent to the first point in time, redirecting I/O workload of the first volume from the first node to the second node over the second path through the interconnect by modifying a path state of the first path from AO to ANO and by modifying a path state of the second path through the interconnect from ANO to AO.

20. A non-transitory computer readable medium comprising code stored thereon that, when executed, performs a method comprising:
configuring a first file server on a first node of a storage system, the first file server including a first file system configured on a first volume, where the storage system includes a second node;
configuring multiple paths, including a first path and a second path, over which the first volume is exposed to the first file server, where said configuring multiple paths includes:
configuring the first path over which the first file system of the first node issues I/Os directed to the first volume, wherein the first path is local on the first node and a first data path component of the first node services I/Os of the first volume sent over the first path;
configuring the second path over which the first file system of the first node issues I/Os directed to the first volume, wherein the second path includes an interconnect between the first node and the second node so that I/Os, that are directed to the first volume and that are issued over the second path, are transmitted from the first file system to the second node where a second data path component of the second node services I/Os of the first volume sent over the second path through the interconnect from the first node to the second node;
configuring a multipath layer of the first node to transmit I/Os directed to the first volume over one of the first path and the second path currently configured with a path state of active-optimized (AO); and at a first point in time, configuring the first path with respect to the first volume with a path state of AO and configuring the second path with respect to the first volume with a path state of active-non-optimized (ANO);

subsequent to the first point in time while the first path with respect to the first volume is configured with a path state of AO and while the second path with respect to the first volume is configured with a path state of ANO, determining an internode I/O workload imbalance between the first node and the second node; and responsive to determining the internode I/O workload imbalance between the first node and the second node, performing first processing to reduce or remove the internode I/O workload imbalance between the first node and the second node including:

at a second point in time subsequent to the first point in time, redirecting I/O workload of the first volume from the first node to the second node over the second path through the interconnect by modifying a path state of the first path from AO to ANO and by modifying a path state of the second path through the interconnect from ANO to AO.

\* \* \* \* \*